(12) United States Patent
Kodaypak

(10) Patent No.: US 12,212,361 B2
(45) Date of Patent: Jan. 28, 2025

(54) BROADBAND NETWORK SLICING SELECTION AND CONTROL

(71) Applicant: Radisys Corporation, Hillsboro, OR (US)

(72) Inventor: Rajendra Prasad Kodaypak, Hillsboro, OR (US)

(73) Assignee: Radisys Corporation, Hillsboro, OR (US)

(*) Notice: Subject to any disclaimer, the term of this patent is extended or adjusted under 35 U.S.C. 154(b) by 154 days.

(21) Appl. No.: 18/174,401

(22) Filed: Feb. 24, 2023

(65) Prior Publication Data

US 2023/0275662 A1   Aug. 31, 2023

Related U.S. Application Data

(60) Provisional application No. 63/268,595, filed on Feb. 25, 2022.

(51) Int. Cl.
| | | |
|---|---|---|
| *H04B 10/00* | (2013.01) | |
| *H04B 10/2575* | (2013.01) | |
| *H04Q 11/00* | (2006.01) | |
| *H04W 48/18* | (2009.01) | |
| *H04J 14/00* | (2006.01) | |

(52) U.S. Cl.
CPC ... *H04B 10/25752* (2013.01); *H04Q 11/0067* (2013.01); *H04W 48/18* (2013.01)

(58) Field of Classification Search
CPC .............. H04J 14/0254; H04J 14/0256; H04J 14/0261; H04J 14/086; H04B 10/2575; H04B 10/25753; H04B 10/25754; H04B 10/27; H04B 10/272; H04B 10/278
See application file for complete search history.

(56) References Cited

U.S. PATENT DOCUMENTS

| | | | |
|---|---|---|---|
| 8,224,135 B2 | 7/2012 | Mizutani et al. | |
| 10,111,163 B2 | 10/2018 | Vrzic et al. | |
| 10,743,250 B2 | 8/2020 | Watfa et al. | |
| 10,798,473 B2 | 10/2020 | Zhang et al. | |
| 10,992,385 B2 | 4/2021 | Yigit et al. | |
| 2016/0329980 A1* | 11/2016 | Zheng | H04L 12/2885 |
| 2021/0036919 A1 | 2/2021 | Foti | |
| 2021/0159984 A1* | 5/2021 | Lee | H04B 10/27 |
| 2021/0168705 A1 | 6/2021 | Fiorese et al. | |

FOREIGN PATENT DOCUMENTS

| | | |
|---|---|---|
| CN | 112087782 A | 12/2020 |
| CN | 113067732 A | 7/2021 |
| CN | 113452593 A | 9/2021 |
| EP | 3873102 A1 | 9/2021 |
| WO | 2019237521 A1 | 12/2019 |

* cited by examiner

*Primary Examiner* — Daniel G Dobson
(74) *Attorney, Agent, or Firm* — Stoel Rives LLP

(57) ABSTRACT

Disclosed are an SDBANS controller and associated orchestration system configured to implement scalable transport network slicing in an XGS-PON. Accordingly, the orchestration system configures the SDBANS controller for different regions and maps TN NSSI ID information to an OLT port of an SD-CPON OLT. The OLT port is allocated by the SDBANS controller.

20 Claims, 24 Drawing Sheets

PON ENABLED FRONTHAUL / MIDHAUL / BACKHAUL TRANSPORT SOLUTIONS

*EXAMPLE SHOWN WITH A SINGLE 16-PORT OPTICAL LINE TERMINAL WITH A DISTRIBUTED SDBANS CONTROLLER

FIG. 15B

1. EXAMPLE REPRESENTS THE MAPPING FOR A 16 PORT OLT
2. THE SDBANS CONTROLLER INSTANCE AND ITS MICROSERVICES HAS A 1:1 PAIRING WITH THE 16p-OLT
3. OTHER MAPPING OPTIONS ARE POSSIBLE AND CAN BE DEFINED BY RULES-BASED POLICY ENGINE
4. LOGIC CAN BE EASILY EXTENDED TO A SINGLE 32p-OLT OR STACKED 2x16p-OLTs SERVED BY A SINGLE INSTANCE OR OLT SPECIFIC SLICE CONTROLLER

16-PORT COMBO-PON OLT

TWO SLICE ID (OSID 1)
(ALL 16 PORTS P1-P16 MAPPED TO OSID 1)

TWO SLICE IDs (OSID 1-2)
(P1-8 TO OSID 1, P9-16 TO OSID 2)

FOUR SLICE IDs (OSID 1-4)
(P1-4 TO OSID 1, P5-8 TO OSID 2, P9-12 TO OSID 3, P13-16 TO OSID 4)

EIGHT SLICE IDs (OSID 1-8)
(P1-2 TO OSID 1, P3-4 TO OSID 2, P5-6 TO OSID 3, P7-8 TO OSID 4, P9-10 TO OSID 5, P11-12 TO OSID 6, P13-14 TO OSID 7, P15-16 TO OSID 8)

SIXTEEN SLICE IDs (OSID 1-16)
(UNIQUE 1:1 PORT-SLICE MAPPING)

FIG 15A

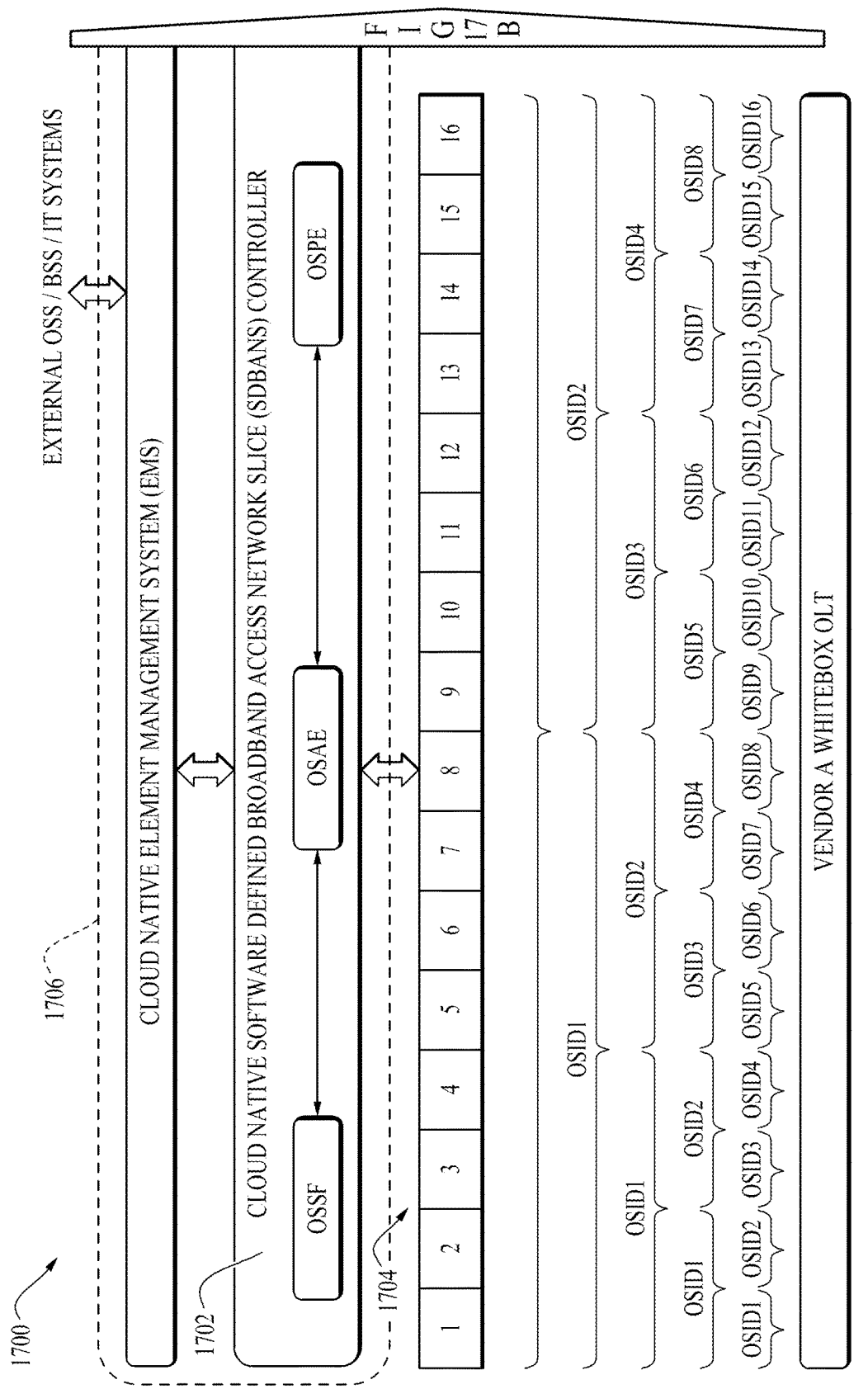

| SERVICE TYPES (ST#) | TN NSSI ID | SDBANS-A | SDBANS-B | SDBANS-C |
|---|---|---|---|---|
| 1 (eMBB.1) (eMBB.2) ... | X12.1 X12.2 ... | REGION A - VENDOR 1 - OLT SKU 1 - OLT SLICE ID # - ST #1.[1 TO n] | REGION B - VENDOR 2 - OLT SKU 1 - OLT SLICE ID # - ST #1.[1 TO n] | REGION C - VENDOR 3 - OLT SKU 1 - OLT SLICE ID # - ST #1.[1 TO n] |
| 2 (URLLC.1) (URLLC.2) ... | X22.1 X22.2 ... | REGION A - VENDOR 1 - OLT SKU 2 - OLT SLICE ID # - ST #2.[1 TO n] | REGION B - VENDOR 2 - OLT SKU 2 - OLT SLICE ID # - ST #2.[1 TO n] | REGION C - VENDOR 3 - OLT SKU 2 - OLT SLICE ID # - ST #2.[1 TO n] |
| 3 (MIoT) | X32 | REGION A - VENDOR 1 - OLT SKU 3 - OLT SLICE ID # - ST #3 | REGION B - VENDOR 2 - OLT SKU 3 - OLT SLICE ID # - ST #3 | REGION C - VENDOR 4 - OLT SKU 3 - OLT SLICE ID # - ST #3 |
| 4 (CV2X) | X42 | REGION A - VENDOR 1 - OLT SKU 4 - OLT SLICE ID # - ST #4 | REGION B - VENDOR 2 - OLT SKU 4 - OLT SLICE ID # - ST #4 | REGION C - VENDOR 4 - OLT SKU 4 - OLT SLICE ID # - ST #4 |
| 5 (PUBLIC SAFETY) | X52 | REGION A - VENDOR 1 - OLT SKU 5 - OLT SLICE ID # - ST #5 | REGION B - VENDOR 2 - OLT SKU 5 - OLT SLICE ID # - ST #5 | REGION C - VENDOR 4 - OLT SKU 5 - OLT SLICE ID # - ST #5 |

Fig. 19

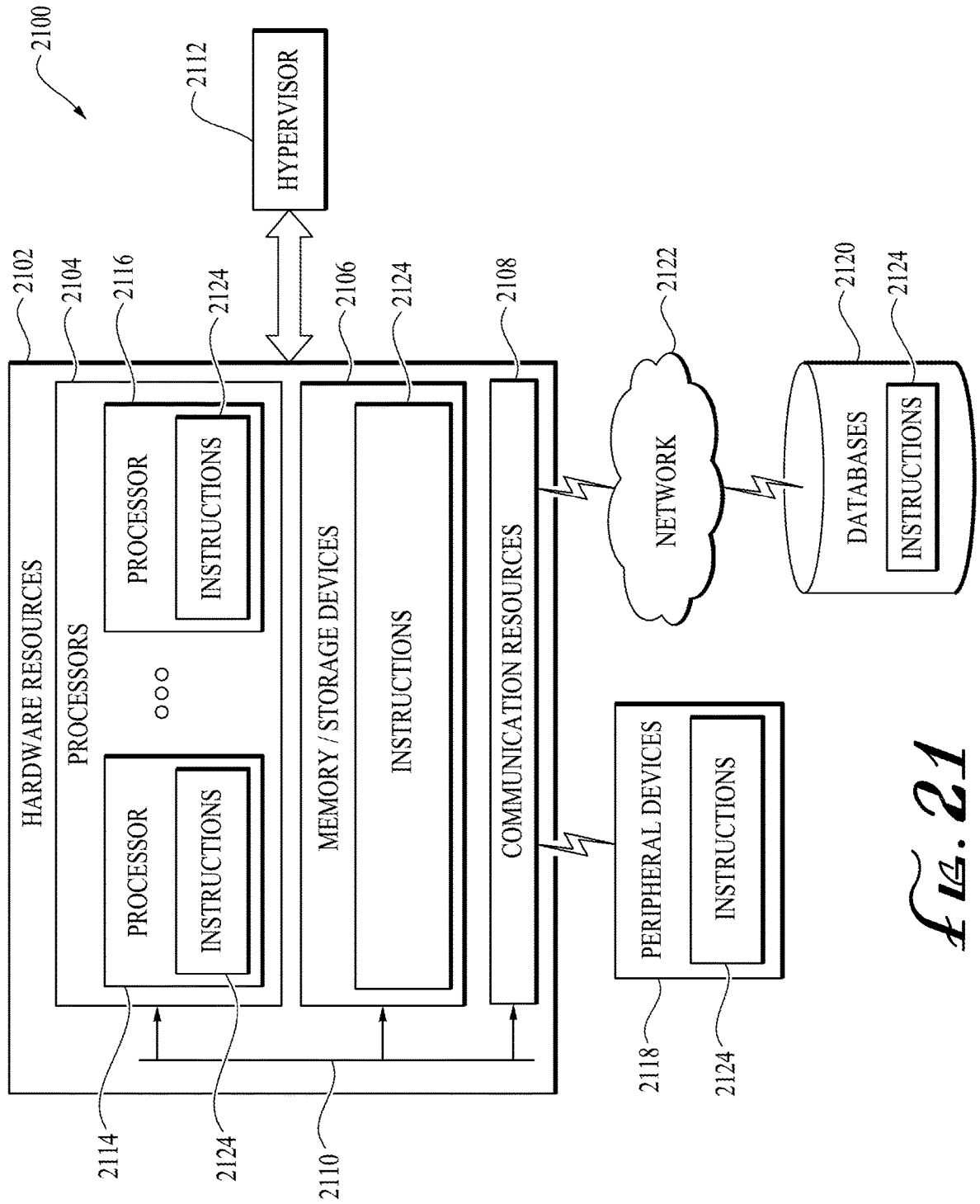

BROADBAND NETWORK SLICING SELECTION AND CONTROL

RELATED APPLICATION

This application claims priority benefit of U.S. Provisional Patent Application No. 63/268,595 filed Feb. 25, 2022, which is hereby incorporated by reference.

TECHNICAL FIELD

This disclosure relates generally to software defined, disaggregated combo-passive optical networking (SD-CPON) optical line termination (OLT) and, more particularly, to configuring an SD-CPON OLT to implement transport network slicing.

BACKGROUND INFORMATION

Massive growth in mobile broadband data services in conjunction with new spectrum availability in licensed/unlicensed bands continues to drive the need for transport network infrastructure expansion. Advanced access transport solutions such as SD-CPON are currently in technology trials and limited deployments. As the telecom and IT industry evolves to address the demands of the next generation connected society, the broadband access transport architectures and solutions need to evolve as well with the advances in cloud native technologies.

BRIEF SUMMARY OF THE DISCLOSURE

With the 3GPP standards-defined network slicing concepts in the radio access and core networks, it is possible to slice independently each of these networking domains hosted in different geographic locations. Even though these two domains can be sliced and operated independently via their domain-specific management orchestrators, it may not yield the best possible end-to-end (E2E) 5G services delivery model. The SD-CPON transport network that connects these two slicing domains is critical in handling the E2E 5G traffic flows and, in turn, delivering massive connection density as well as the capacity, performance, media-intensive applications and their respective service layer experience. The SD-CPON-enabled, all-optical access transport network is used to transport multi-Gbps data traffic between disaggregated 5G radio access network (O-RAN) and a core network, in addition to carrying traditional fixed broadband services on the same infrastructure.

According to some embodiments, a novel slicing mechanism allows infrastructure providers as well as the commercial service providers to cooperate and coordinate cost-effective utilization of their transport resources for superior services delivery. This concept is referred to as software defined broadband access network slicing (SDBANS) that has an intelligent means of defining, mapping, allocating, monitoring, reporting, and ensuring the slices within the transport layer effectively carry a variety of mobility and wireline workloads. SDBANS enables multiple infrastructure and service providers to cooperate, coordinate, and uniquely design, develop, and deploy next-generation mobility services globally.

With SDBANS, it is possible to ensure a more deterministic way of slicing the transport domain to be able to flexibly allocate slices to meet targeted 5G mobile and fixed broadband services within a given region or for a given service or for a given service provider. With a sliced transport model between the disaggregated RAN and core networking domains, the disclosed techniques offer infrastructure providers (InPs) and communications service providers (CSPs) an ability to design intelligent network-sharing methods with automation and domain-specific analytics.

In some embodiments, a SD-CPON transport solution is deployed with the SDBANS controller in a distributed or centralized configuration. Such a solution can benefit service providers in at least the following ways: vendor neutrality, agile deployment models with full flexibility, cost-efficiency, and providing a path for next-generation access technology evolution. Depending on the connection density, services supported, and associated traffic aggregation in a targeted serving area, the SDBANS could be deployed to suit operator specific needs. The SDBANS architecture can be elastically scaled with its microservices model to meet the capacity and performance requirements in a targeted coverage area. With policy-driven rules for mapping the CPON OLT slices to the transport network slice instance, it is possible to design an advanced cross-domain network slicing control and management layer that is key to an operator's business success in terms of monetizing shared infrastructure resources.

Physical unbundling of software defined broadband access network resources is not an attractive option in ultrafast 5G mobile broadband deployments and their evolution across several industry verticals. But virtual unbundling of mobile xHaul transport resources potentially gives rise to an intelligent, flexible, scalable network ecosystem design with innovative service offerings and differentiation via revenue-sharing models. SDBANS enables logical partitioning/slicing and isolation of critical shared network resources among the service providers and/or virtual network operators (VNOs) via unique mapping, finer granular monitoring, measurement, and tighter control. SDBANS supports open standards interface adoption when interworking with cross-domain (5G-RAN/Core) slice orchestrators results in enhanced customer satisfaction with SDBANS control layer and reduced CapEx/OpEx. SDBANS provides for harmonizing the InPs and VNOs via data, control, and management usage across the E2E network with slice-specific analytics and performance. Shared resource utilization could result in differentiated network upgrade costs among VNOs/InPs. SDBANS also provides for real-time service variations, dynamic unicast/multicast offerings, bandwidth reservations for applications on demand, and charging at the SD-CPON transport slice level. This can drive continuous innovation via broadband services differentiation, leveraging SDBANS innovative concepts, and in turn drive mass adoption of 5G at lower cost and operational complexity in greenfield/brownfield markets.

Additional aspects and advantages will be apparent from the following detailed description of embodiments, which proceeds with reference to the accompanying drawings.

BRIEF DESCRIPTION OF THE DRAWINGS

To easily identify the discussion of any particular element or act, the most significant digit or digits in a reference number refer to the figure number in which that element is first introduced.

FIG. 15A and FIG. 15B are, respectively, left and right sides of a block diagram showing a mapping example for an SDBANS controller.

FIG. 17A and FIG. 17B are, respectively, left and right sides of a block diagram showing a mapping example for an SDBANS controller according to the centralized model.

FIG. 19 is a table showing a mapping of a transport network (TN) network slice subnet instance ID (NSSI ID) to OLT slice IDs (OSIDs).

FIG. 21 is a block diagram showing components of an SD-CPON or orchestration system, in accordance with one embodiment.

DETAILED DESCRIPTION OF EMBODIMENTS

Figure 1:
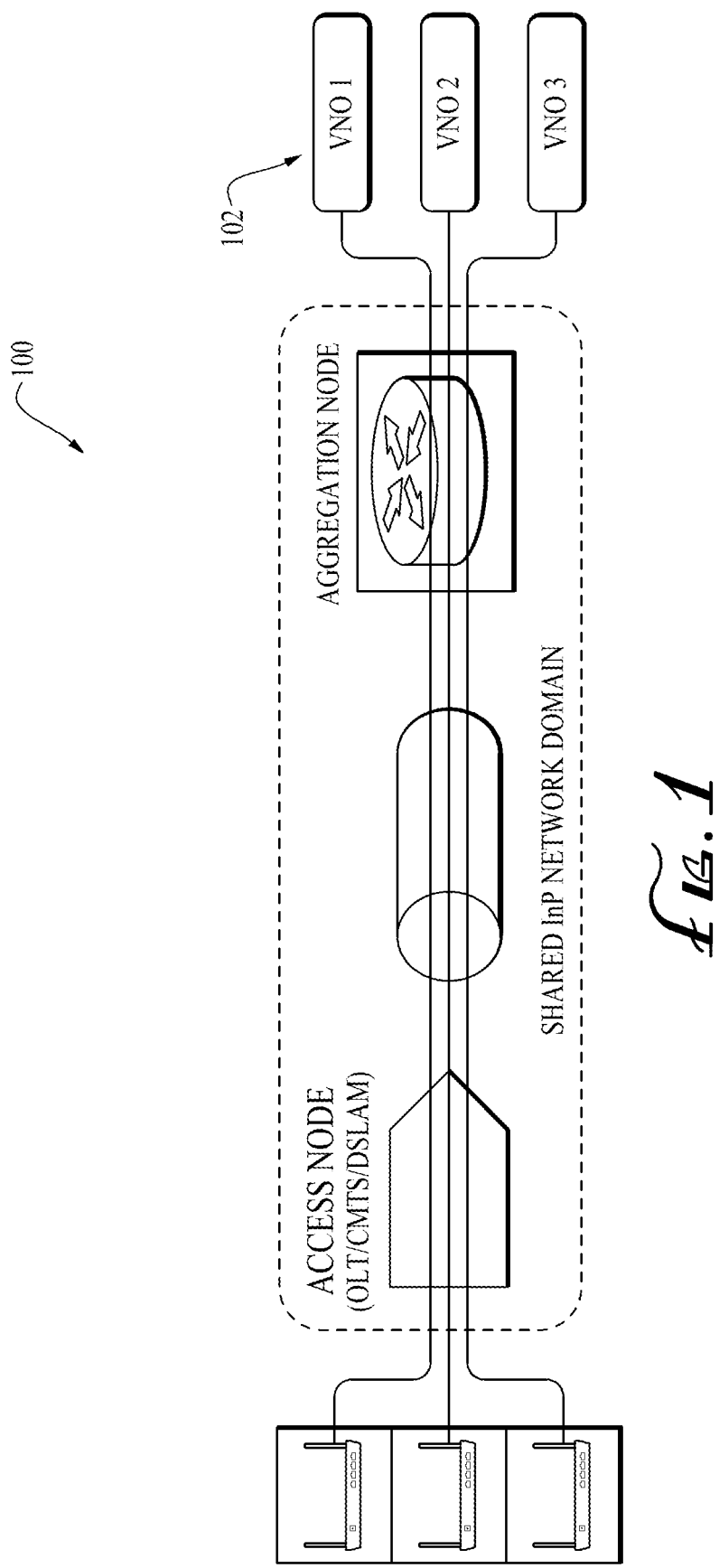
FIG. 1 is a block diagram showing a fixed access network sharing (FANS) system.

FANS is a technique defined and standardized by the Broadband Forum (BBF) that allows the access network to be virtualized so that it would be shared by multiple service providers. There are several gaps in the technical standards as to how modern SDN/NFV principles can be applied to transport slices and management of the slice resources within the access network architectures. These sliced transport access networks could be useful building blocks for enabling advanced 5G wireless and broadband services across the various industry verticals (e.g., eMBB, URLLC, MIoT, CV2X, or others).

Industry has witnessed a passive optical network (PON) technology transformation over the last two decades, from Gigabit PON (G-PON) technology to most recently the XGS-PON (10 Gigabit Symmetrical PON) technology. XGS-PON technology has attracted attention to drive the demands of enterprise, residential, and wholesale premium broadband services. XGS-PON provides a building block of the mobile xHaul (x means front, mid, or back haul) network architecture as it provides the fastest means of transporting massive amounts of 5G user data, that belongs to a specific slice, from the next generation disaggregated radio access networks simultaneously operating across low, mid, and high spectrum bands. Although other types of PON such as NG-PON2 exist today, they are not as cost-effective as XGS-PON and in turn drive the total cost of ownership for a service provider.

In an SD-CPON architecture, each optics port within the OLT could be configured as a combo (G-PON and/or XGS-PON) port, which then determines the amount of bi-directional data that this port can carry. Such a port could be split across multiple users/homes/enterprises via an all-optical distribution network depending on the coverage (range), density and end-user capacity requirements set by the operator. Each port could be a single slice, or a group of ports combined to form a slice with unique identities with port-to-slice mapping that needs to be maintained in the slice controller. Such transport network slice level mapping could be exposed via an open standards application programming interface (API) to cross-domain slicing orchestrators to ensure there is E2E integrity in the overall slicing mapping, optimal allocation and utilization of resources, slice functionality, performance, and delivery of a superior end-user experience.

The SD-CPON OLT could be deployed in a distributed or centralized model based on the operator-specific requirements. In a distributed model, the containerized software with its slicing control and management microservices can be co-resident with the hardware whereas in a centralized model the software could be deployed in any cloud environment with suitable adapters providing connectivity to the remote physical OLT hardware. Lack of effective coordination and cooperation strategies between mobility and transport slicing solutions would pose a major risk to infrastructure as well as service providers in designing and developing next-generation broadband access network architectures. Such designs can easily become complex in terms of interworking; prohibitively expensive in terms of their installations, operations, and management; and not conducive to their seamless evolution. Hence, there is a need for an intelligent means of defining, mapping, monitoring, and controlling the selection of slices within the SD-CPON transport network so that this can enable cooperative E2E slicing as well as dynamic pairing across the cross-domain radio access and core networks resulting in an enhanced shared network infrastructure for service providers that can deliver desired performance.

The XGS-PON standard features a 10 Gbps symmetrical data delivery option that enables service providers to skip the non-symmetrical versions of PON technologies such as the G-PON/XG-PON. This technology operates over a downstream wavelength of 1,577 nm and an upstream wavelength of 1,270 nm, which allows compatibility to operate over the same optical distribution network with legacy G-PON that uses a wavelength of 1,490 nm in downstream and 1,310 nm in upstream.

The SD-CPON platform enables the OLT to operate on XGS-PON/G-PON/XGS-PON+G-PON technologies on a single PON port and distribute the workloads to the network termination endpoints. Such an architecture gives flexibility to the service providers via software intelligence layer to adapt to the next-generation of PON technologies as well as serve a variety of customers, e.g., residential, enterprise and wholesale, with varying applications, services, and quality of service (QoS).

With advances in 5G technologies including software defined and disaggregated radio access and core networking functions embracing cloud native deployments, the ultra high-speed mobility workloads need to be transported effectively with minimal transport delays. The availability of multiple spectrum bands with enormous channel bandwidths drives the need for XGS-PON solutions to carry the multi-Gbps data streams between the radio access and core functions hosted in cloud data centers.

In order to provide enhanced 5G mobile broadband services deployed across a large geographic area, multiple cell sites have to be deployed to cover outdoor and indoor environments. These cell sites may have varying levels of transport requirements based on spectrum allocations in that area. The SD-CPON platforms are an ideal choice for 5G transport as they could be plugged in as xHaul deployment models to drive massive adoption of cost-effective O-RAN solutions. In addition to carrying the 5G workloads, there could be customers in the same area that may require dedicated multi-Gbps symmetrical speeds for premium residential, enterprise, and wholesale services. Deploying parallel transport network solutions to meet the disparate needs of mobility and fixed wireline workloads will be costly and extremely difficult to operate, and will potentially incur losses on their ROI.

With 5G deployments spanning across low, mid, and high frequency bands, there could be a variety of deployment models based on a given market serving area, spectrum availability, density, capacity, and services to be supported. Deep fiber fed SD-CPON technologies are a means of delivering cost-effective transport to residential, enterprise, and wholesale customers with varying traffic/applications/services demands. The disaggregated nature of the SD-CPON solution allows access network slicing concept to be effectively utilized by operators to leverage existing fiber fed technologies (FTTX) architectures, fiber ducts, cabinets, etc. to aggregate and transport massive amounts of mobile broadband data.

FIG. 1 shows an example of a FANS system 100, which enable cost-effective resource utilization when an infrastructure provider (InP) has control of a physical access network that supports virtual unbundling to several VNOs 102. With deep FTTX and Software Defined Access, the physical unbundling provides a means for virtual unbundling (also known as slicing) of the resources to enable differentiated or innovative services. FANS system 100 provides standardized interfaces (per BBF TR-370) that allow network information (diagnostics, faults, performance management) to be exposed by the InP to VNO, enabling automated operations across the InP/VNO domains according to a standards-defined approach. An objective of FANS system 100 is to enable VNOs 102 to perform operations with virtual unbundling similar to their operations with physical unbundling. FANS system 100 allows a VNO to request and/or perform changes in network configuration and control their own virtual network. Network management becomes a shared responsibility with FANS working across InP and VNO domains. The levels of data sharing and their resolution/accuracy may be different, distinguished by both domains.

Figure 2:
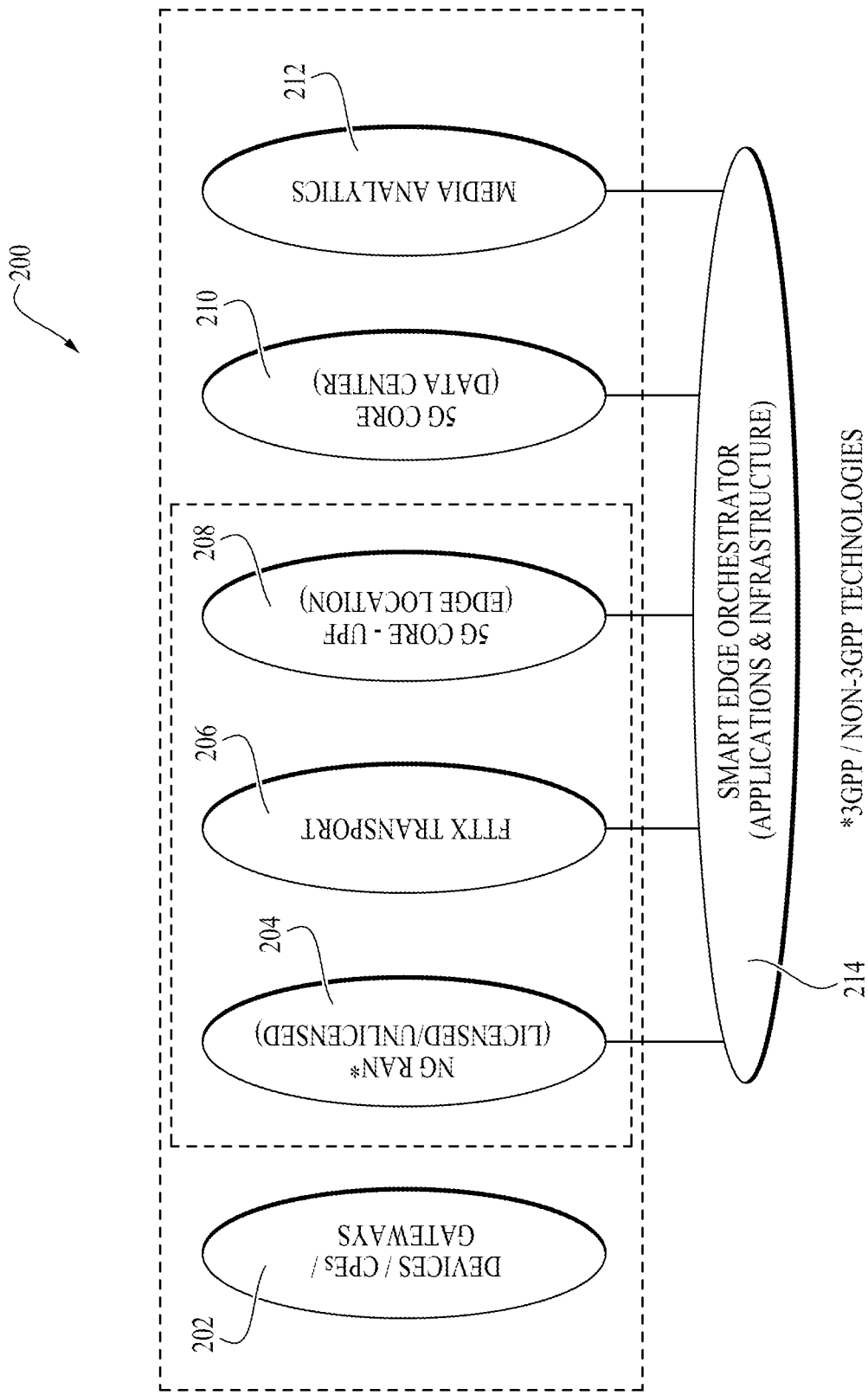
FIG. 2 is a high-level system block diagram for wireless communications.

FIG. 2 shows a high-level system 200 for wireless communications. High-level system 200 includes user equipment and devices 202, an NG RAN 204, an FTTX transport 206, a 5G core (edge location) 208, a 5G core (data center) 210, media analytics 212, and an orchestrator 214.

User equipment and devices 202 represents different types of devices such as customer-premises equipment (CPE), gateway, and smart home IoT gateways. The types of user equipment and devices 202 are constantly evolving. User equipment, for example, includes smartphones and tablets, capable of communications over 5G and Wi-Fi 6 or 7. IoT devices may include public safety types of devices.

NG RAN 204 may include an open RAN with integrated Wi-Fi, and may have licensed and unlicensed bands. NG RAN 204, therefore, may support a converged infrastructure including 3GPP and non-3GPP wireless communications technologies for the mobility services and also fixed broadband services.

FTTX transport 206 is a fiber optic transport wired infrastructure that ties NG RAN 204 and 5G core (edge location) 208. FTTX transport 206 is intended to scale so as to accommodate access networks and multiple bands (low, mid, and high; licensed and unlicensed; and shared bands) on the order of multi-gigabit per second from a single cell site.

5G core (edge location) 208 includes a user-plane function at the edge location for local processing. In other embodiments, that function is at 5G core (data center) 210. 5G core (edge location) 208 may also include centralized controller functions, signaling planes and authentication, subscription management, policy management, and other functions. The strategy to locate the user plane functions at the edge may depend upon some specific use cases, for example, like mission critical services, public services, and bandwidth-rich intensive conversational services that are sensitive to quality of experience, and video processed locally. Putting this user plane function closer to the cell site avoids transporting that information to a centralized data center somewhere located far off from the cell site, with the added benefit of leveraging FTTX transport 206.

5G core (data center) 210 includes the control plane functions hosted in a centralized location within a data center. This can be in public, private, hybrid cloud, and other types of deployments.

Media analytics 212 is an engine that can process all the media processing information. This could come from the user plane functions located near the edge as well or in a data center.

Orchestrator 214 is also shown to support service providers by facilitating management all the different entities shown in FIG. 2 and provide desired services.

Figure 3:
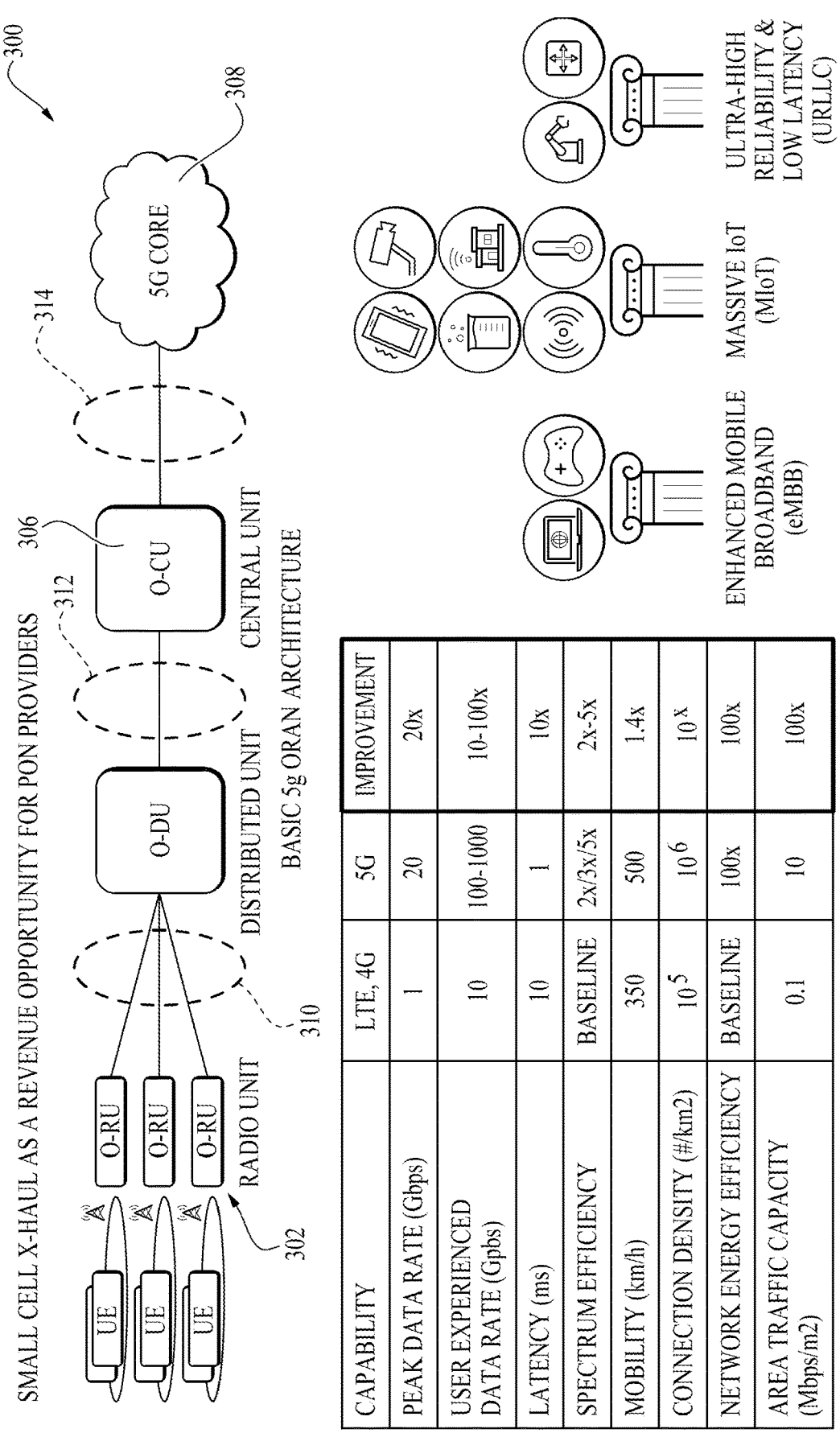
FIG. 3 is a block diagram showing a 5G O-RAN system.

FIG. 3 shows a 5G O-RAN standalone reference architecture 300, which includes O-RUs 302, an O-DU 304, an O-CU 306, and a 5G core 308. Between these disaggregated network functions are the transport infrastructure including fronthaul 310, midhaul 312, and backhaul 314. With one DU and one CU, 5G O-RAN standalone reference architecture 300 may represent a single cell cite with 360-degree coverage (each O-RU 302 supports a cell of 120-degree coverage).

Figure 4:
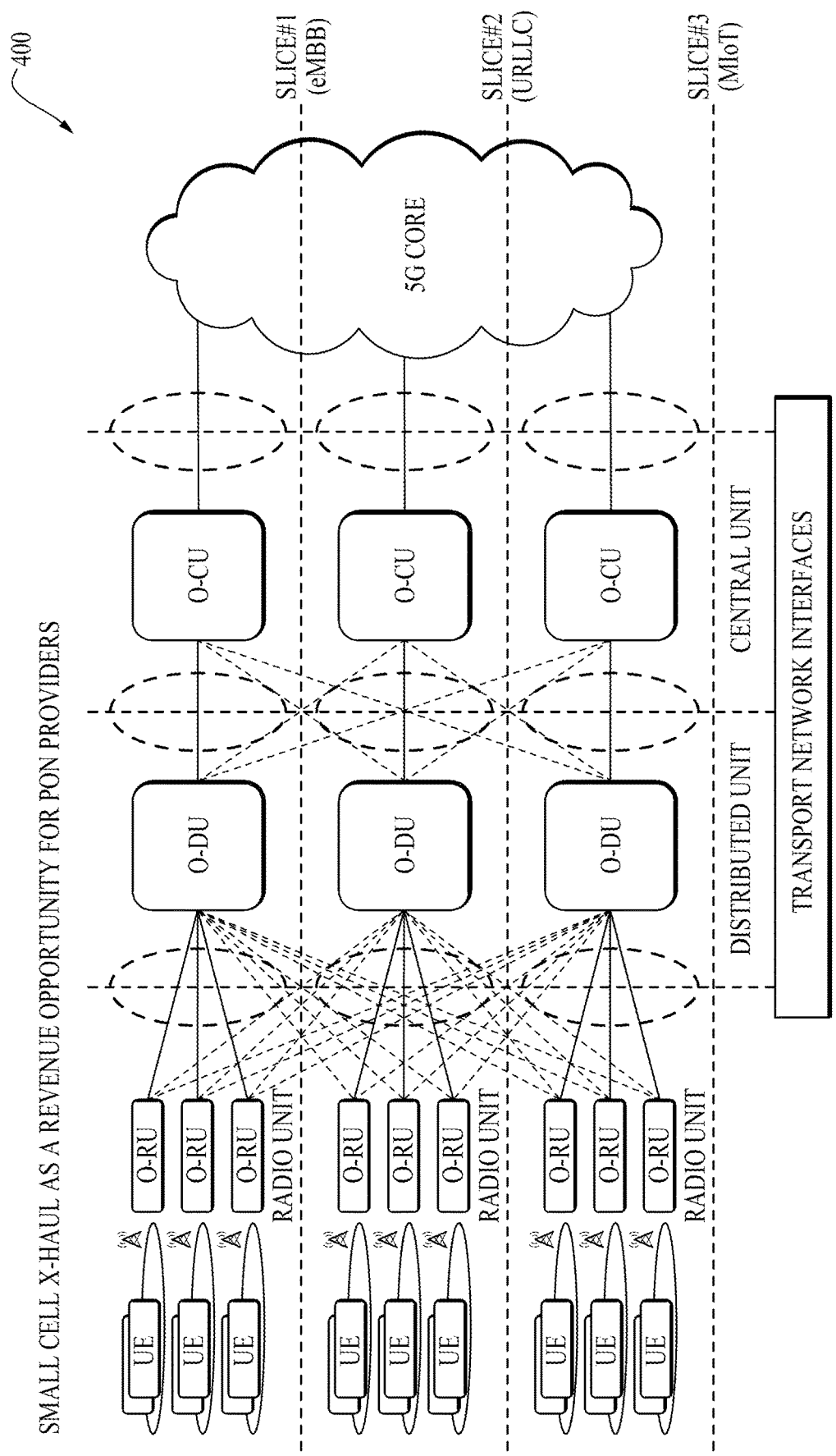
FIG. 4 is a block diagram showing a 5G O-RAN network slicing architecture, according to a dedicated distributed unit (DU)/central unity (CU) model.

FIG. 4 shows a 5G O-RAN network slicing architecture—dedicated DU/CU model 400. In large-scale deployments, there may be multiple cells (e.g., nine, in the example of FIG. 4). In the example of FIG. 4, there are also three slices, which each may be subject to certain strict service level agreements. With nine cells and three slices, full mesh connectivity results in 27 fiber connections in the front haul (nine connections to each of three DUs). Likewise, in the midhaul, each DU is connected to the three CUs. In the backhaul, each CU is connected to the 5G core. Efficiently managing the transport network interfaces in a scalable manner to support slicing has been a challenge.

Figure 5:
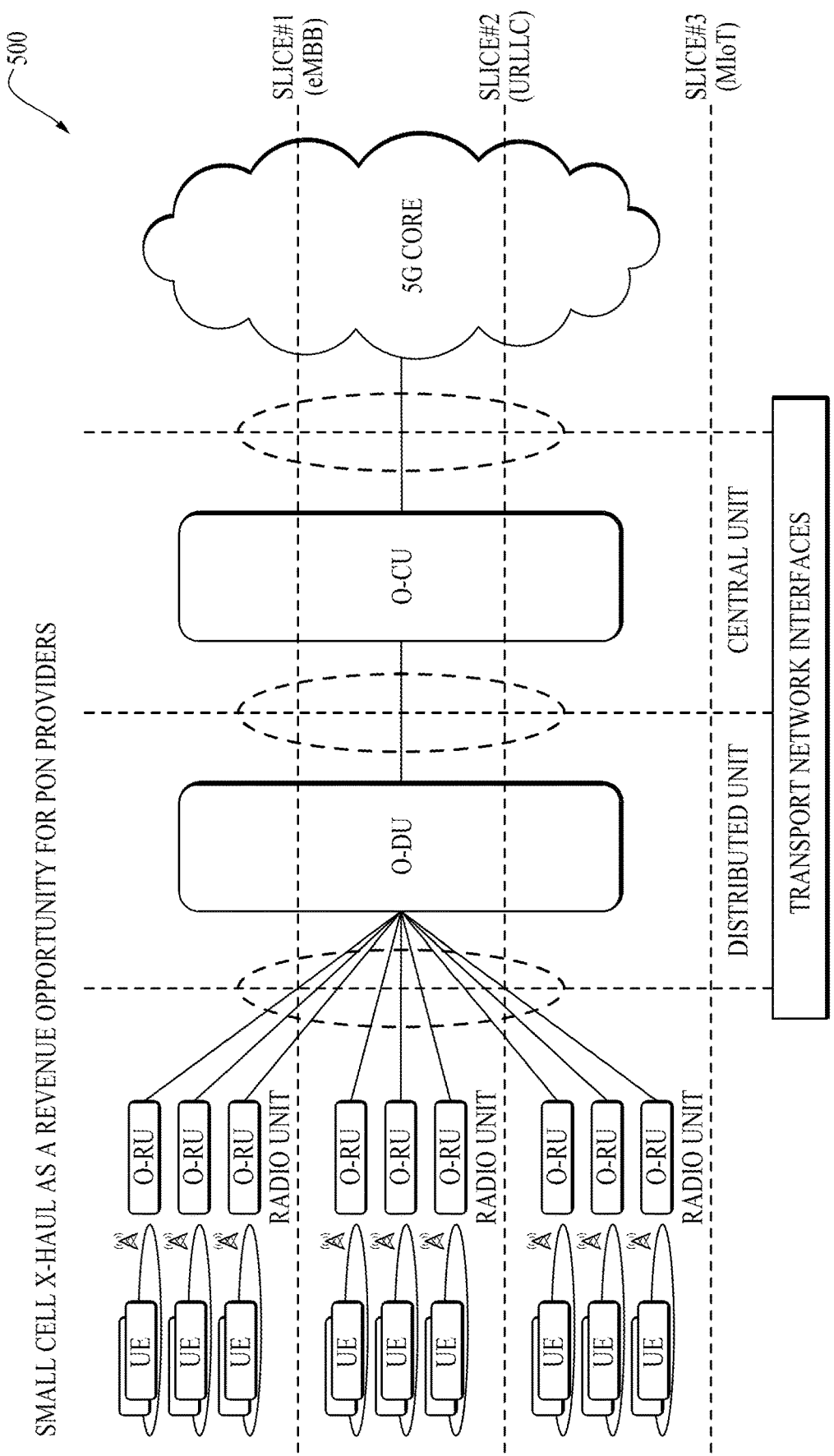
FIG. 5 is a block diagram showing a 5G O-RAN network slicing architecture, according to a shared DU/CU model.

FIG. 5 shows a 5G O-RAN network slicing reference architecture—shared DU/CU model 500. In the example of FIG. 5, there are nine cells that connect to a single DU. Even in a shared model, the number of fiber connections becomes unwieldy with slicing and at scale.

Figure 6:
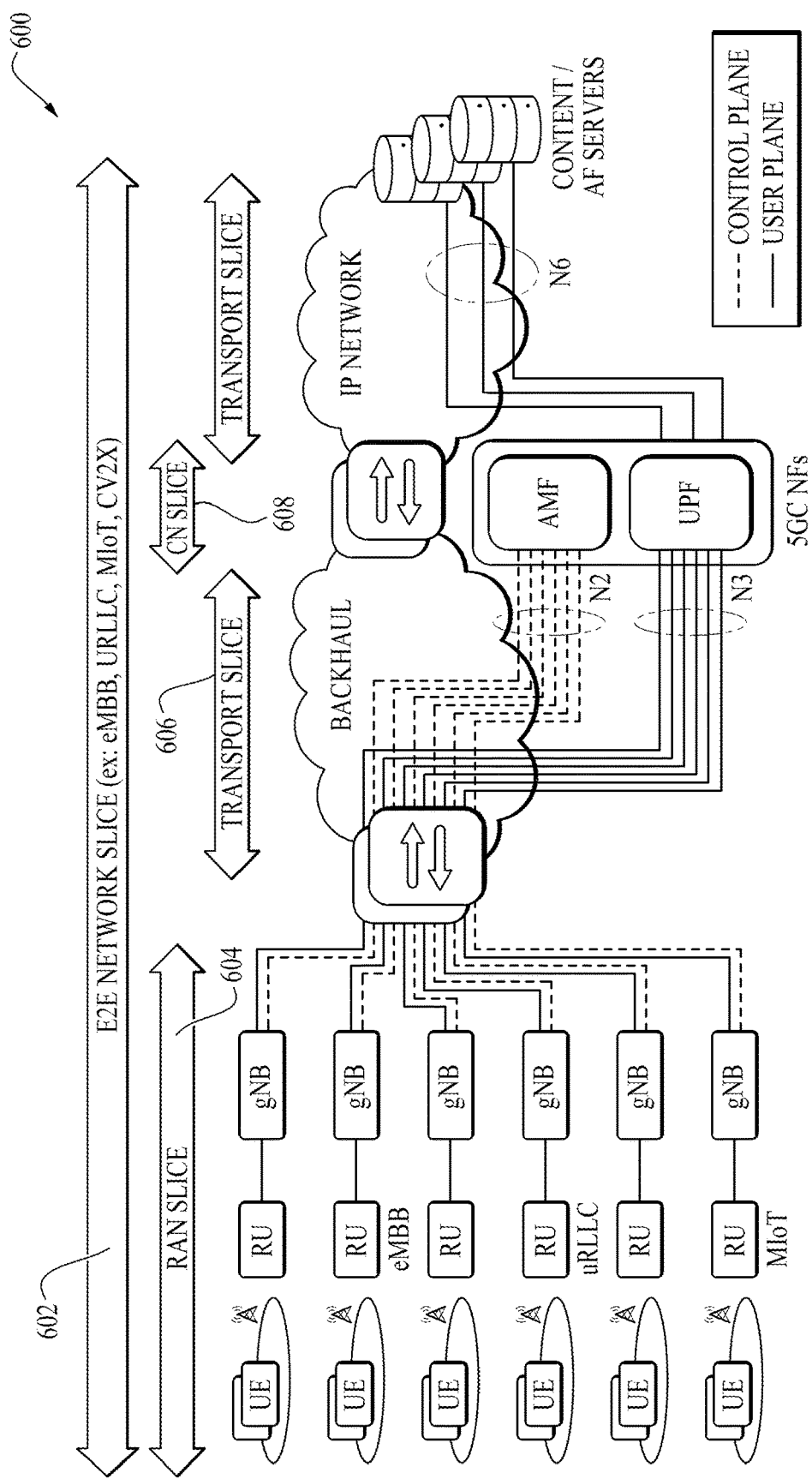
FIG. 6 is a block diagram of an xHaul-enabled distributed-RAN.

FIG. 6 shows an xHaul-enabled distributed-RAN 600. In the example of FIG. 6, xHaul-enabled distributed-RAN 600 comprises a network slice 602, a RAN slice 604, a transport slice 606, and a CN slice 608.

Figure 7:
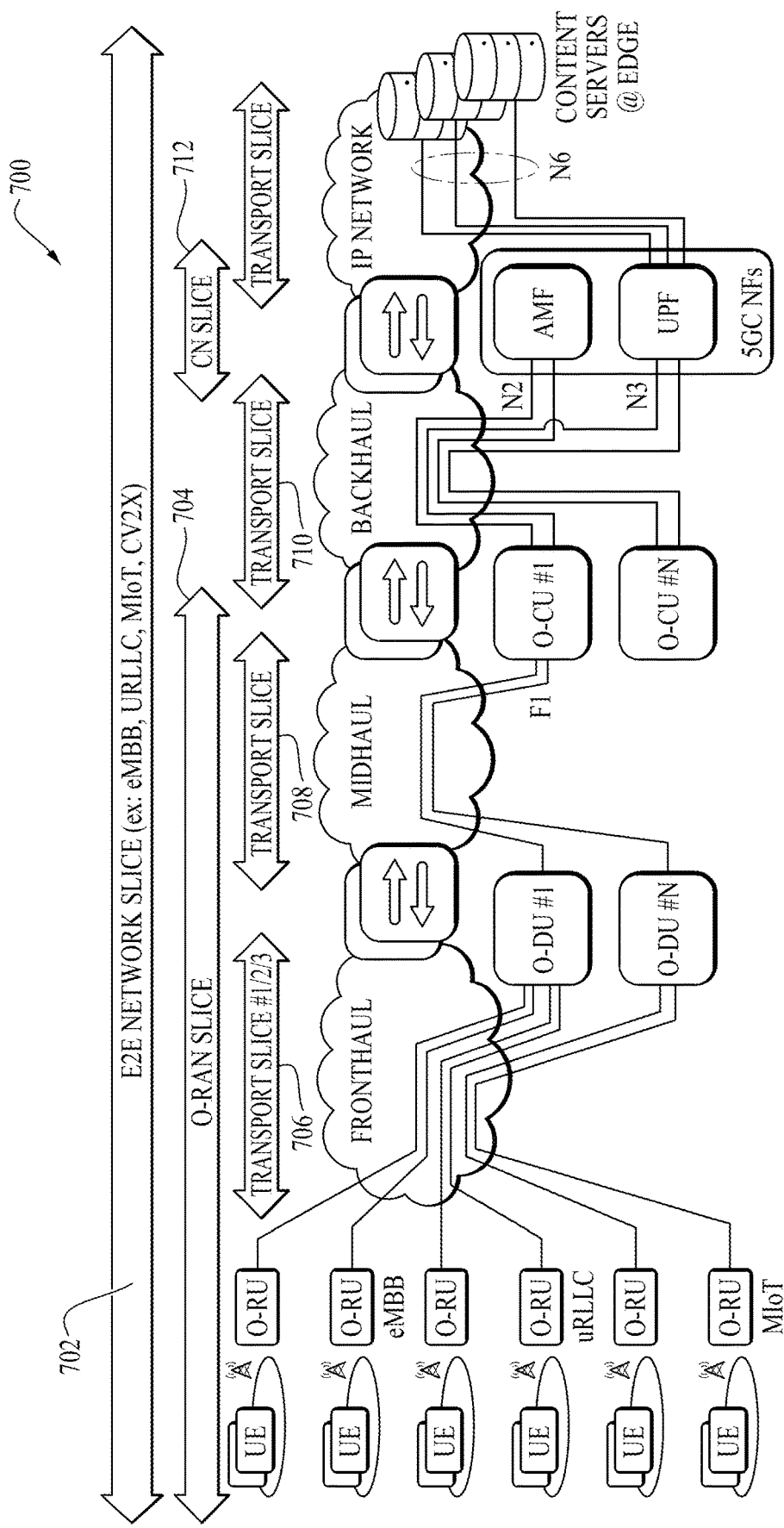
FIG. 7 is a block diagram of an xHaul-enabled cloud-RAN.

FIG. 7 shows an xHaul-enabled cloud-RAN 700. In the example of FIG. 7, xHaul-enabled cloud-RAN 700 comprises a network slice 702, an O-RAN slice 704, a fronthaul transport slice 706, a midhaul transport slice 708, a backhaul transport slice 710, and a CN slice 712. O-RAN slice 704 covers all the RAN components (the O-RU, O-DU, and O-CU). Backhaul transport slice 710 then connects the O-RAN into the core network.

Figure 8:
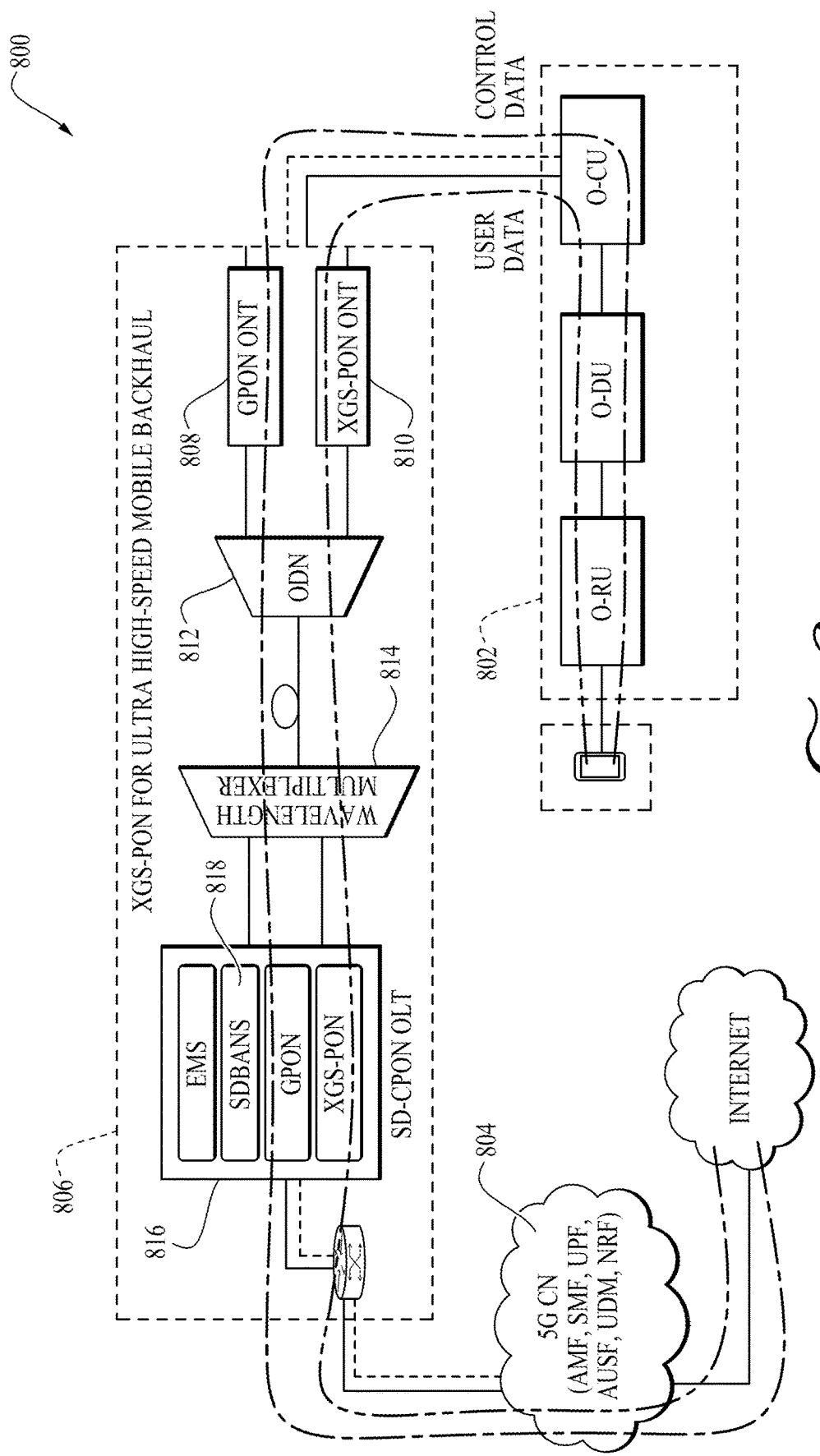
FIG. 8 is a block diagram of a converged 5G O-RAN+XGS-PON system.

FIG. 8 shows a converged 5G O-RAN+XGS-PON setup 800. In the example of FIG. 8, an O-RAN 802 connects to a 5G core network 804 through an XGS-PON 806.

XGS-PON 806 acts as a backhaul aggregation architecture to aggregate the fiber connections from O-RAN 802. XGS-PON 806 includes a G-PON optical network terminal (ONT) 808; an XGS-PON ONT 810, an optical distribution network (ODN) 812; a wavelength multiplexer 814 for optical multiplexing; and an SD-CPON OLT 816. SD-CPON OLT 816 includes an SDBANS controller 818.

Because SD-CPON OLT 816 is disaggregated, its software is decoupled from the CPON-OLT hardware platform. Therefore, the software component of the OLT can be distributed (see, e.g., FIG. 12) or centralized (see, e.g., FIG. 13) based on the deployment model that a service provider may chose, depending on the traffic forecasted in a given geographical region. In some disaggregated models, the software itself can be further subdivided into discrete microservices that are independently scalable.

Figure 9:
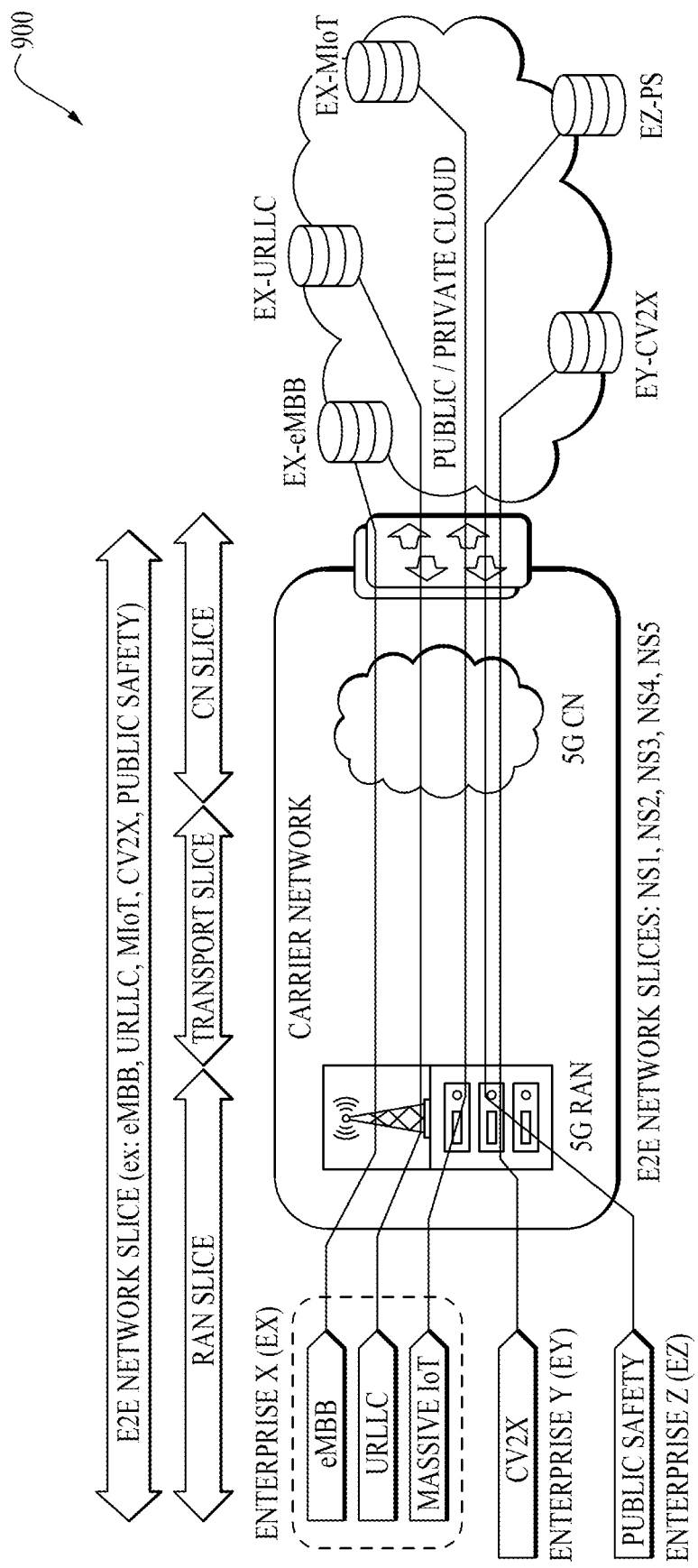
FIG. 9 is a block diagram showing E2E network slicing with optical transport.

FIG. 9 shows an E2E network slicing with optical transport 900. In the example of FIG. 9, E2E network slicing with optical transport 900 includes three different domains. At the left is the access network domain, which is this cellular band slice. In the middle is the transport network domain, which includes the fiber infrastructure that is connecting the RAN to the core network using a transport network slice. And right of that is the core network, which is supported with a core network slice.

Figure 10:
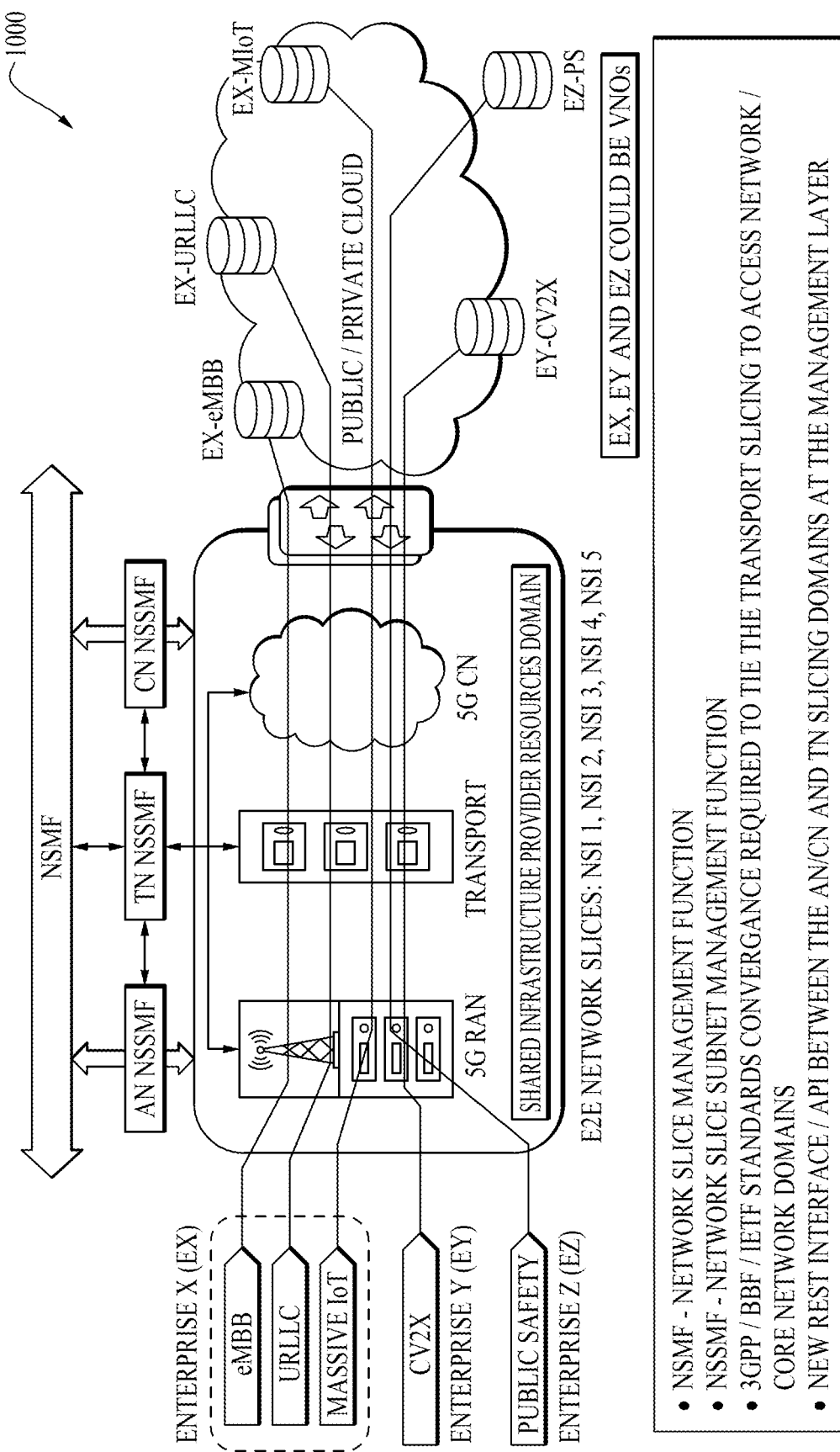
FIG. 10 is a block diagram showing E2E network slicing with slice management functions.

FIG. 10 shows an example of E2E network slicing with slice management functions 1000. Similar to FIG. 9, the example shows an access network, network slice subnet management function for managing all the access network slices. In the transport network, there is a transport network, slice subnet management function that can manage all of the transport slices. And similarly, there is a core network, network slice subnet management function that manages all the core network slices. On the right-hand side, there are the termination points, which include applications in each of these enterprises. This can be a single service provider or VNOs.

Figure 11:
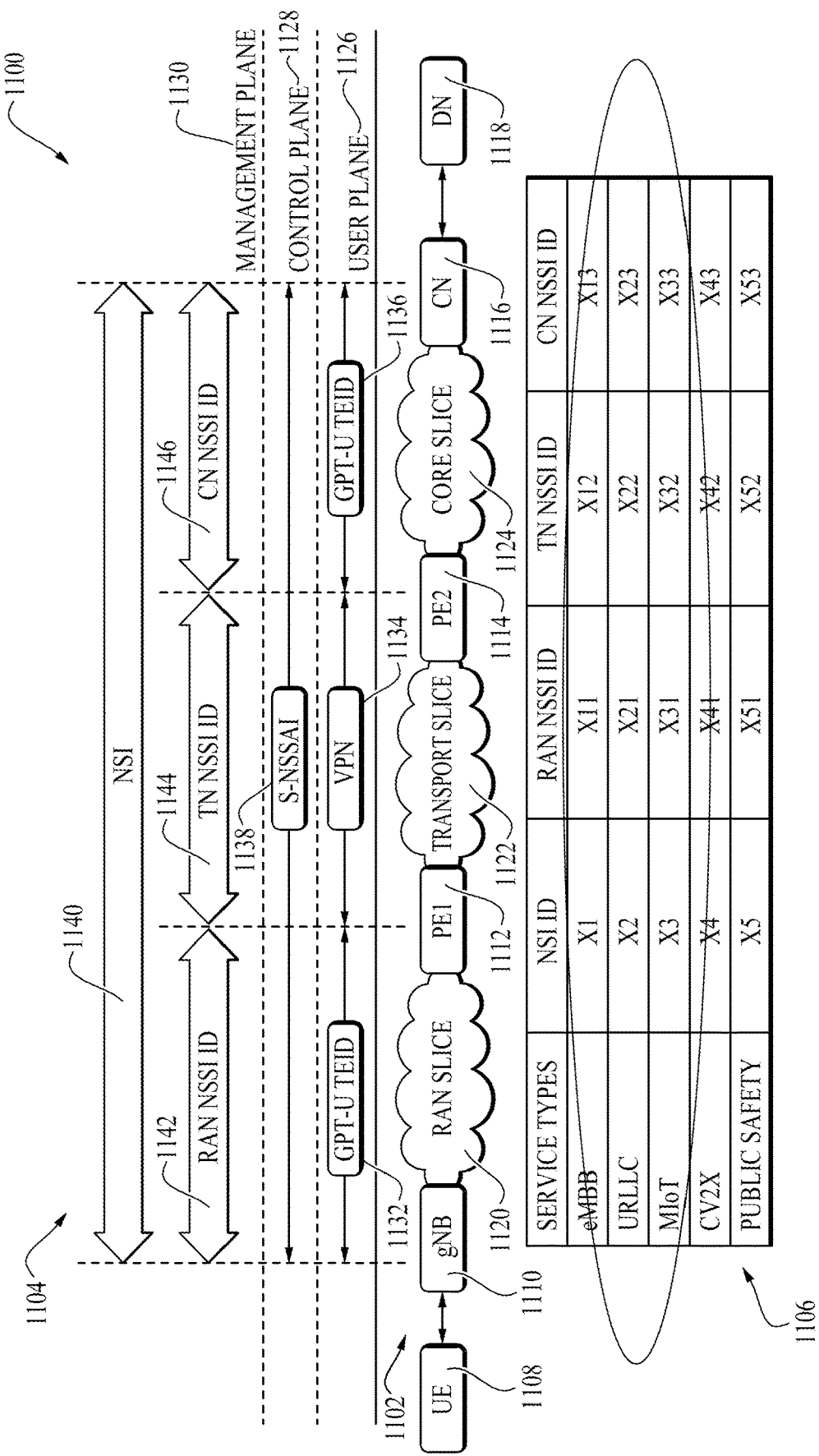
FIG. 11 is a block diagram showing E2E cross-domain network slice mapping.

FIG. 11 shows an E2E cross-domain network slice mapping system 1100, which is illustrated using the example of three systems: a communication system 1102, a slicing system 1104, and a slice mapping system 1106.

Communication system 1102 includes a UE 1108, a gNB 1110, a first provider edge aggregation router 1112, a second provider edge aggregation router 1114, a core network 1116, and a data network 1118. A RAN slice 1120 carries communications between gNB 1110 and first provider edge aggregation router 1112. A transport slice 1122 carries communications between first provider edge aggregation router 1112 and second provider edge aggregation router 1114. A core slice 1124 carries communications between second provider edge aggregation router 1114 and core network 1116.

Slicing system 1104 includes a user plane 1126, a control plane 1128, and a management plane 1130.

In user plane 1126, GTP-U is used for carrying user data within the GPRS core network and between the radio access network and the core network. The user data transported can be packets in any of IPv4, IPv6, or PPP formats. A GTP-U Tunnel endpoint identifier (TEID) 1132, is a 32-bit (4-octet) field used to multiplex different connections in the same GTP tunnel. A VPN 1134 is used for carrying user data in transport slice 1122. And a GTP-U TEID 1136 carries communications in core slice 1124.

In control plane 1128, Single-Network Slice Selection Assistance Information (S-NSSAI) 1138 provides for identification of a network slice. NSSAI is a collection of S-NSSAIs.

In management plane 1130, a Network Slice Instance (NSI) 1140 includes a RAN network slice subnet instance (NSSI) ID 1142; a TN NSSI ID 1144; and a CN NSSI ID 1146.

Slice mapping system 1106 shows how five different service types are each allocated a different slice. Each slice is mapped to its service according to an NSI 1140, RAN NSSI ID 1142, TN NSSI ID 1144, and CN NSSI ID 1146. This mapping allows for logically partitioning each of the three slice domains to help pair them. For example, an eMBB slice is paired with X11, X12, and X13. The mapping provides flexibility in terms of horizontal scaling and also in terms of vertical scaling. More services can be added with unique slice instances, and then each one can be associated with a unique slice across the domains, logically.

Figure 12:
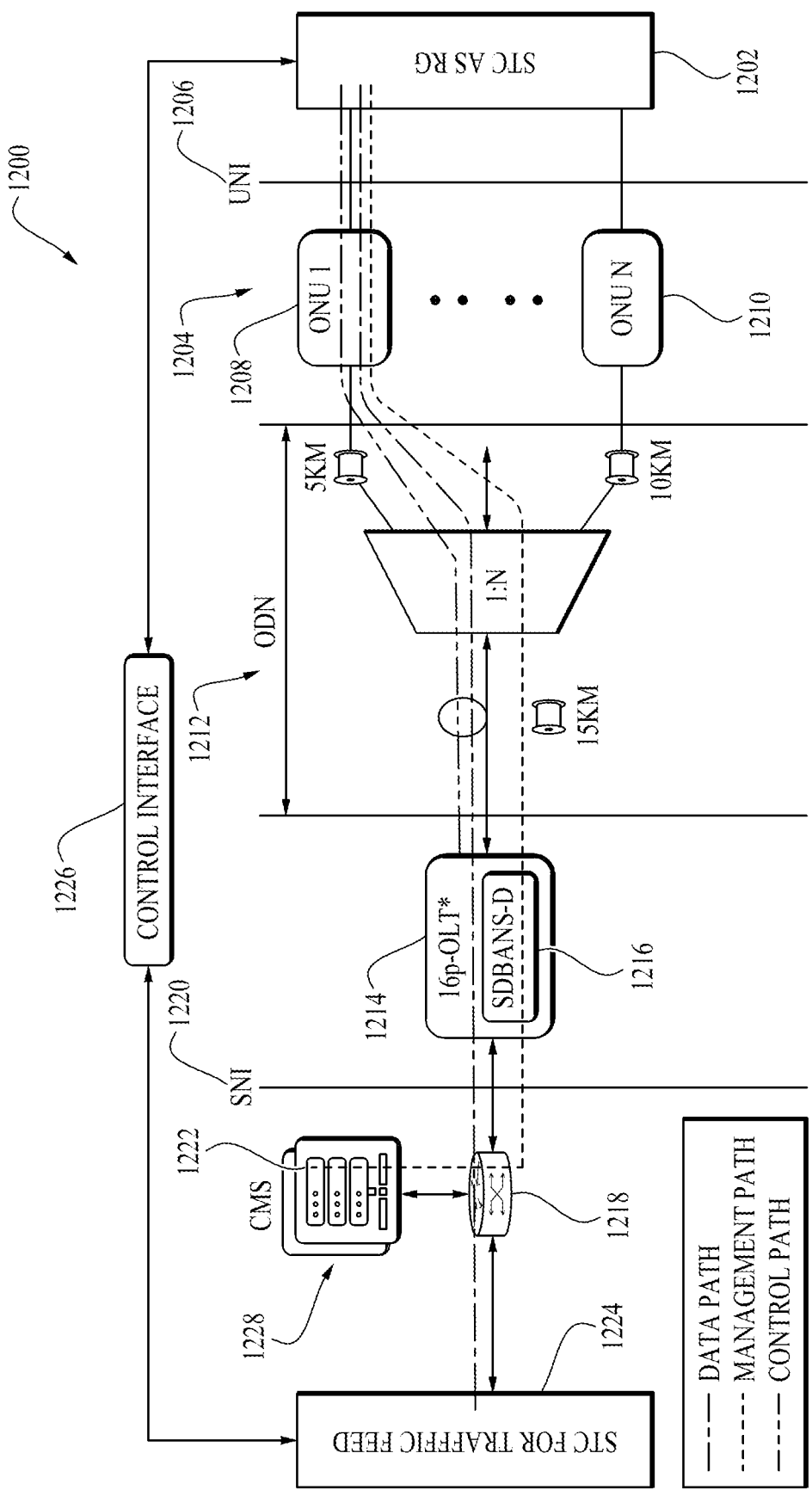
FIG. 12 is a block diagram showing control/management/data path flow in a distributed OLT model.

FIG. 12 is an example of a distributed OLT model 1200 showing control/management/data path flow. Distributed OLT model 1200 includes an STC 1202 (e.g., traffic testing tool, residential gateway) connected to a set of ONUs 1204 via a user-network interface (UNI) 1206. Set of ONUs 1204 includes a first ONU 1208 though a Nth ONU 1210 that are communicatively coupled to an ODN 1212. ODN 1212 is coupled to OLT 1214, which includes a distributed SDBANS-D controller 1216 having a controller application embedded within the OLT 1214 hardware platform. OLT 1214 is coupled to an aggregator 1218 via a service-network interface, SNI 1220. Aggregator 1218 provides data to a cloud management system (CMS) 1222 or an element management system (EMS) and an STC 1224. A control interface 1226 is provided to control each of STC 1202 and STC 1224.

ODN 1212 may be similar to ODN 812 and include wavelength multiplexer 814 (FIG. 8). For example, instead of carrying 100 fibers from 100 DUs into one CU, ODN 1212 aggregates the fiber connections (e.g., at a cell site) in the optical domain to provide them to OLT 1214 that implements a slice controller.

Figure 13:
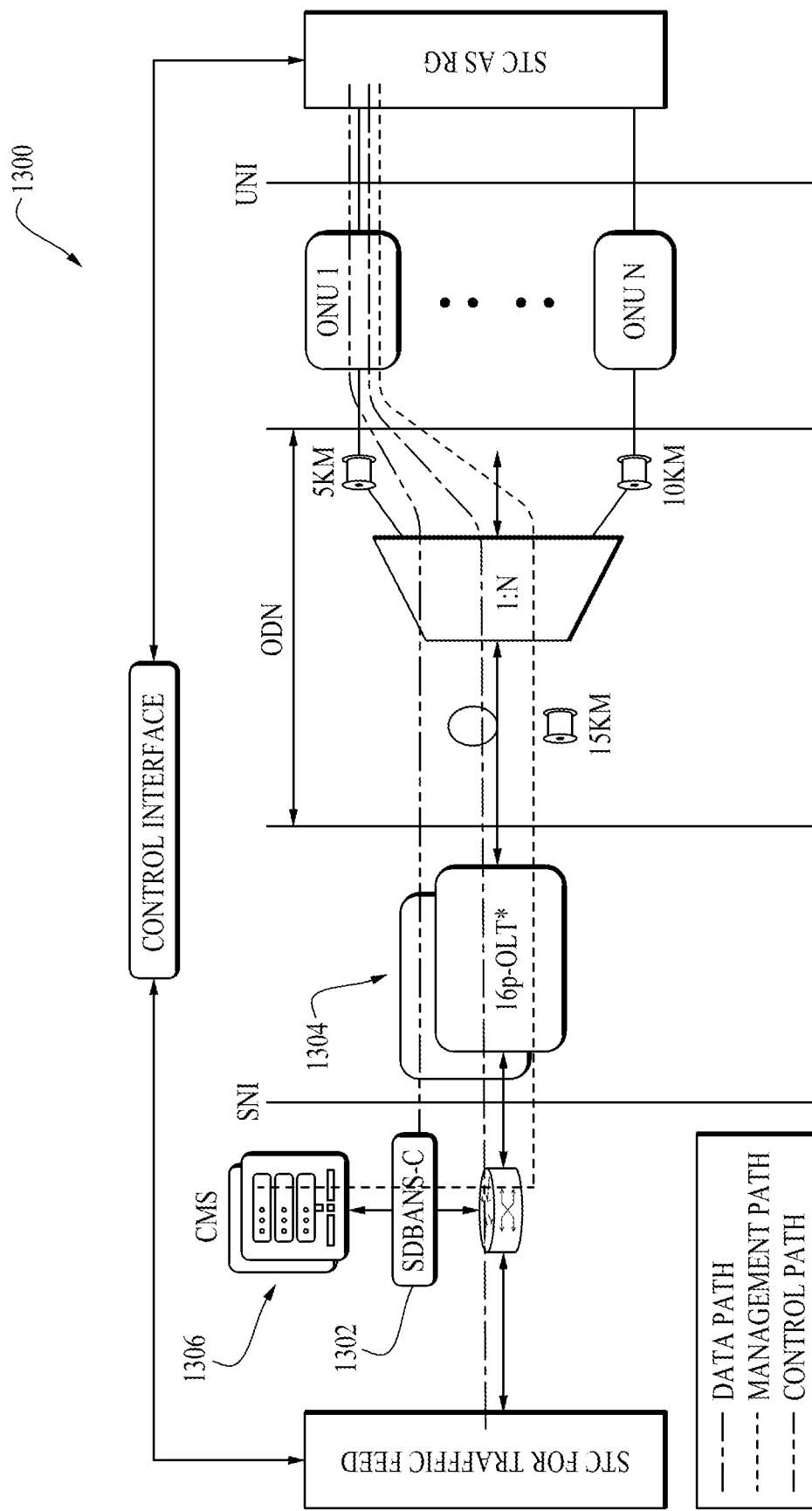
FIG. 13 is a block diagram showing control/management/data path flow in a centralized OLT model.

In contrast to a distributed model of FIG. 12 showing distributed SDBANS-D controller 1216, FIG. 13 shows an example of a centralized OLT model 1300 with its control/management/data path flow. In centralized OLT model 1300, a centralized SDBANS-C controller 1302 is cloud native to allow it to aggregate information from multiple OLTs 1304. Thus, centralized SDBANS-C controller 1302 is decoupled from the OLT hardware platforms to allows it to scale it independently and manages multiple OLT platforms. For example, in an M×N mesh combination of DUs to CUs, one OLT may not provide sufficient network capacity. Accordingly, multiple OLTs 1304 are stacked at the termination point, with centralized SDBANS-C controller 1302 being able to independently scale, in the software, as capacity demands on the aggregation change.

Figure 14:
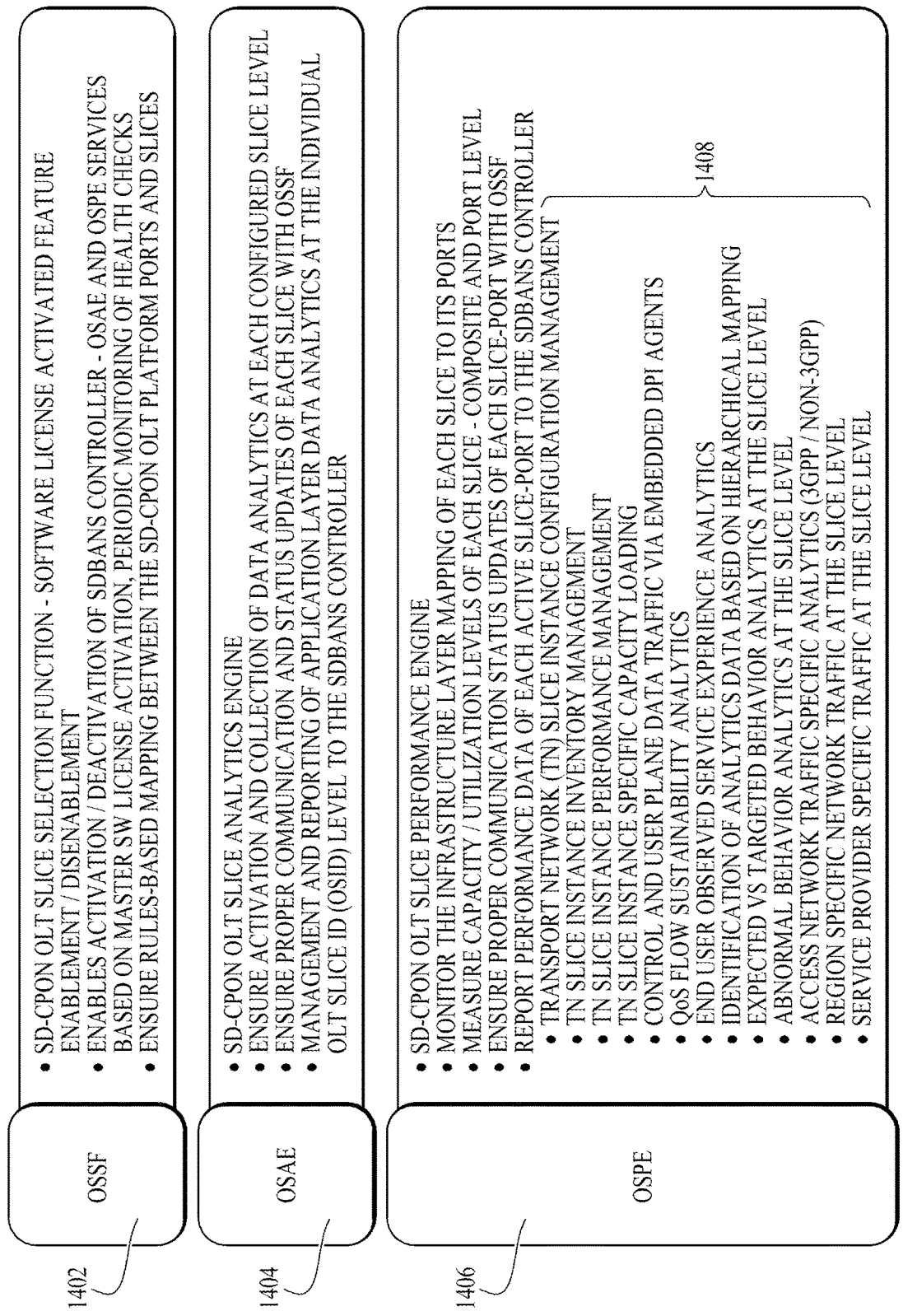
FIG. 14 is a block diagram showing components of an SDBANS controller.

FIG. 14 is an annotated table showing three components 1400 of an SDBANS controller. The SDBANS controller includes an CPON OLT Slice Selection Function (OSSF) 1402; OLT Slice Analytics Engine (OSAE) 1404; and OLT Slice Performance Engine (OSPE) 1406, with example types of performance data 1408.

These three blocks operating in unison ensure that the SD-CPON network is optimally utilized when carrying such hybrid workloads delivering superior functionality and service layer experience. The controller can also expose via standards-based APIs to cross-domain slice orchestrators to allow for dynamic pairing of transport slices between next-generation radio access and core networks. Such a pairing model ensures E2E intelligent networking design that is flexible and reconfigurable, adapts to dynamic workloads as traffic demands continue to grow over time, and provides an easy-to-scale strategy for graceful evolution.

Each of these components 1400 can be implemented as microservices independently from the RAN and core slicing domains and thus provide full flexibility in terms of a FANS model that could be leveraged by multiple VNOs for delivering enhanced broadband services. Each of these components 1400 also has unique functions that could be implemented as containerized microservices in the control and management layer so that each can be scaled independently.

Figure 15A:
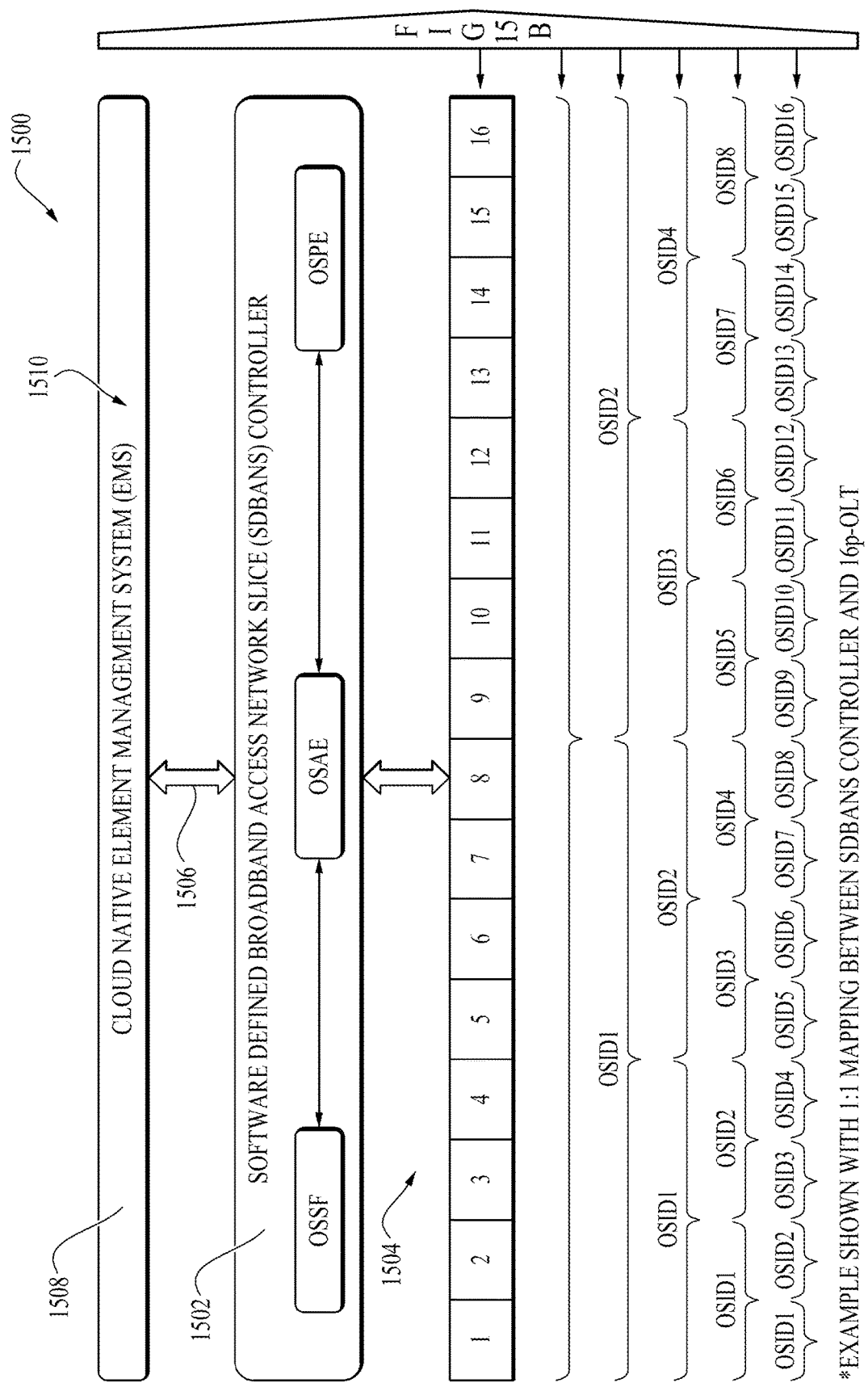

FIG. 15A and FIG. 15B show an annotated block diagram of an example mapping process 1500 in the transport network between an SDBANS controller 1502 and a 16 port OLT 1504. Each of the 16 ports is a physical port (e.g., supporting one or 10 Gbps service). Other numbers of ports are also possible.

Mapping process 1500 allows logical grouping of these ports so different groups can support different slices. For example, four slices (each having four ports), identified by OSID1-OSID4, can be mapped to IoT slices, mobile broadband, or other uses.

FIG. 15A and FIG. 15B also show how data from SDBANS controller 1502 can be exposed to non-PON interfaces through a Rest API 1506 with a cloud native EMS 1508. Accordingly, the data is accessible through EMS 1508. In this example, EMS 1508 includes a transport domain slice orchestrator 1510.

Figure 16A:
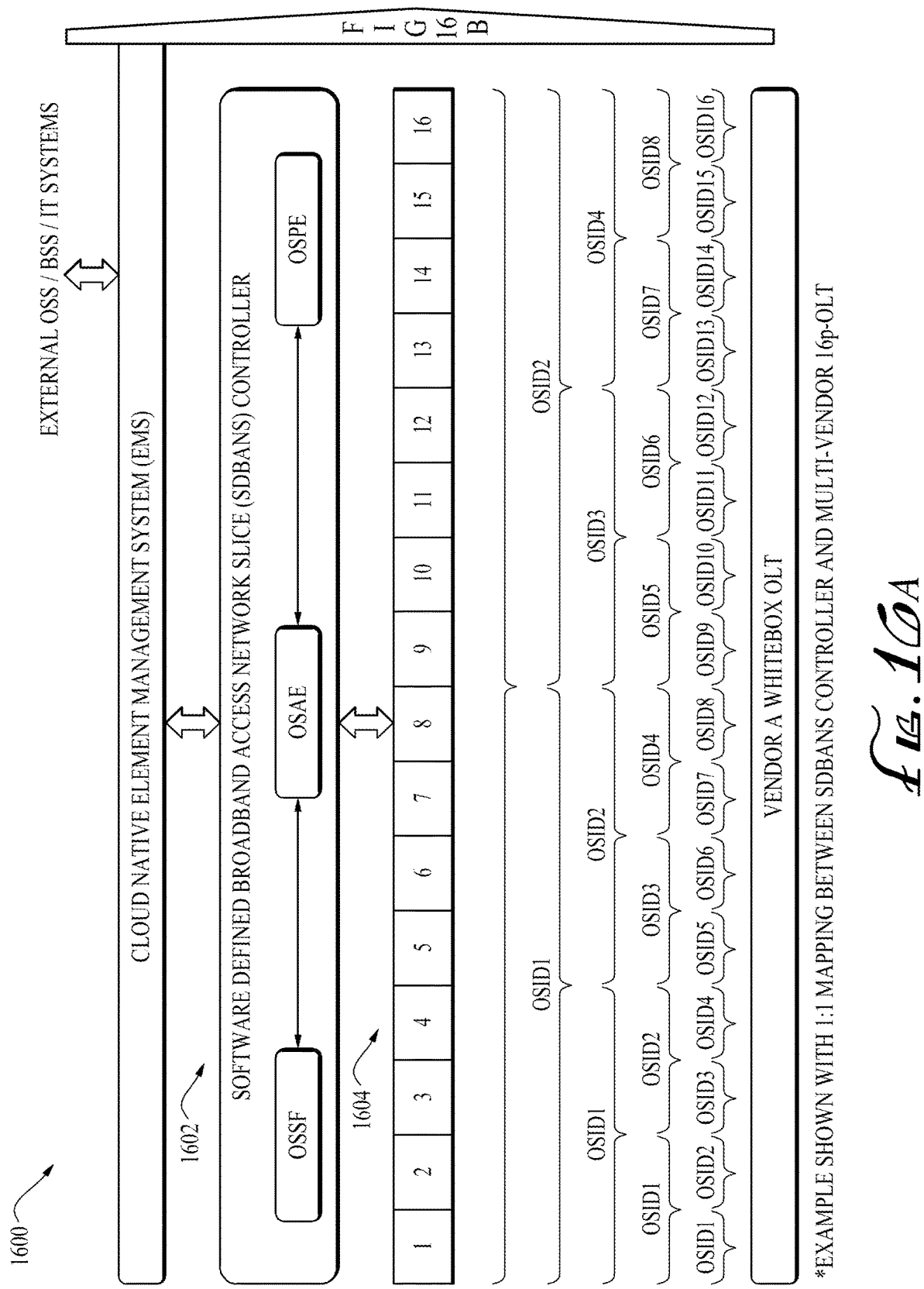
FIG. 16A and FIG. 16B are, respectively, left and right sides of a block diagram showing a mapping example for an SDBANS controller according to the distributed model.
Figure 16B:
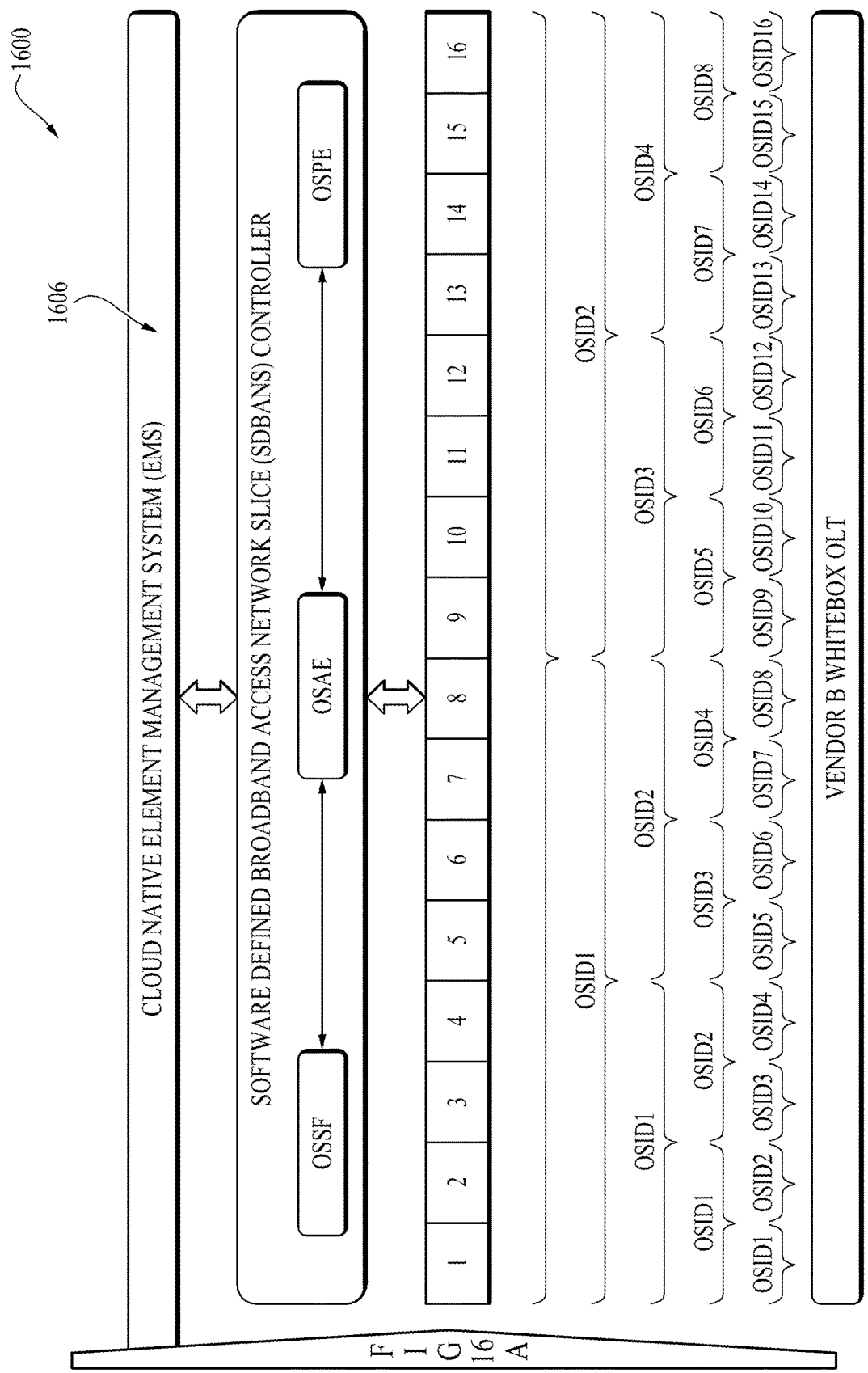

FIG. 16A and FIG. 16B show an annotated block diagram of an example mapping process 1600 in the transport network between distributed SDBANS controllers 1602 (see, e.g., distributed SDBANS-D controller 1216 of FIG. 12) and multiple 16-port OLTs 1604. In this distributed model, each OLT includes a different controller. A transport domain slice orchestrator 1606 is also implemented in an EMS.

Figure 17B:
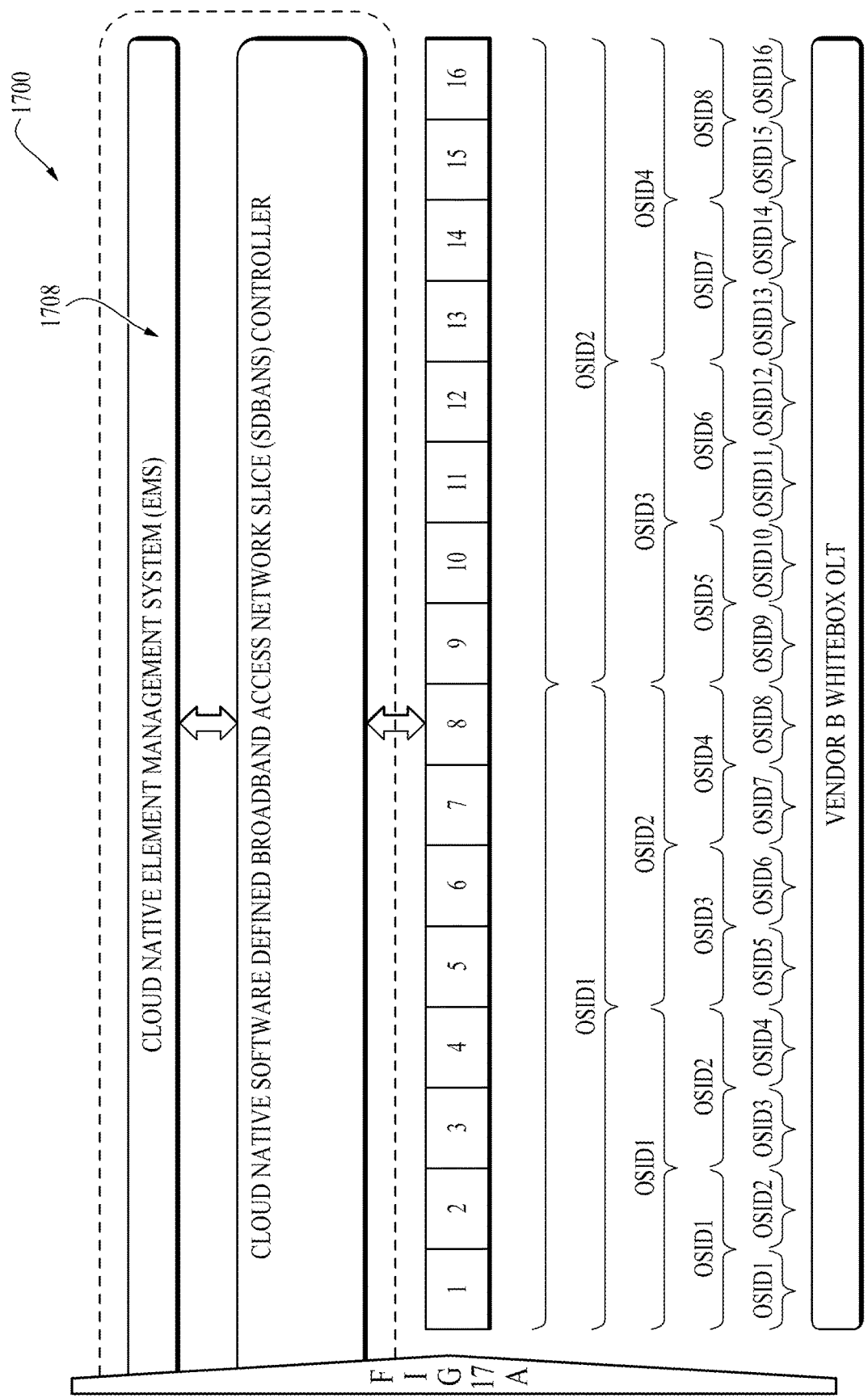

FIG. 17A and FIG. 17B show an annotated block diagram of an example mapping process 1700 in the transport network between a centralized SDBANS controller 1702 (see, e.g., Centralized SDBANS-C controller 1302 of FIG. 13) and multiple 16-port OLTs 1704. In this centralized model, each OLT is mapped by centralized SDBANS controller 1702, which can be implemented as part of a cloud system and converged domain orchestrator 1706. A transport domain slice orchestrator 1708 is also implemented in an EMS.

In some embodiments, an example of a converged domain orchestrator is described in U.S. patent application Ser. No. 17/810,593, filed Jul. 1, 2022, and titled "Data Driven Energy Efficiency in Open Radio Access Network (O-RAN) Systems." For instance, the '593 application describes a converged domain data analytics function (CDDAF) that collects analytics information across the access, transport, and core network domains so as to dynamically configure the network.

Figure 18:
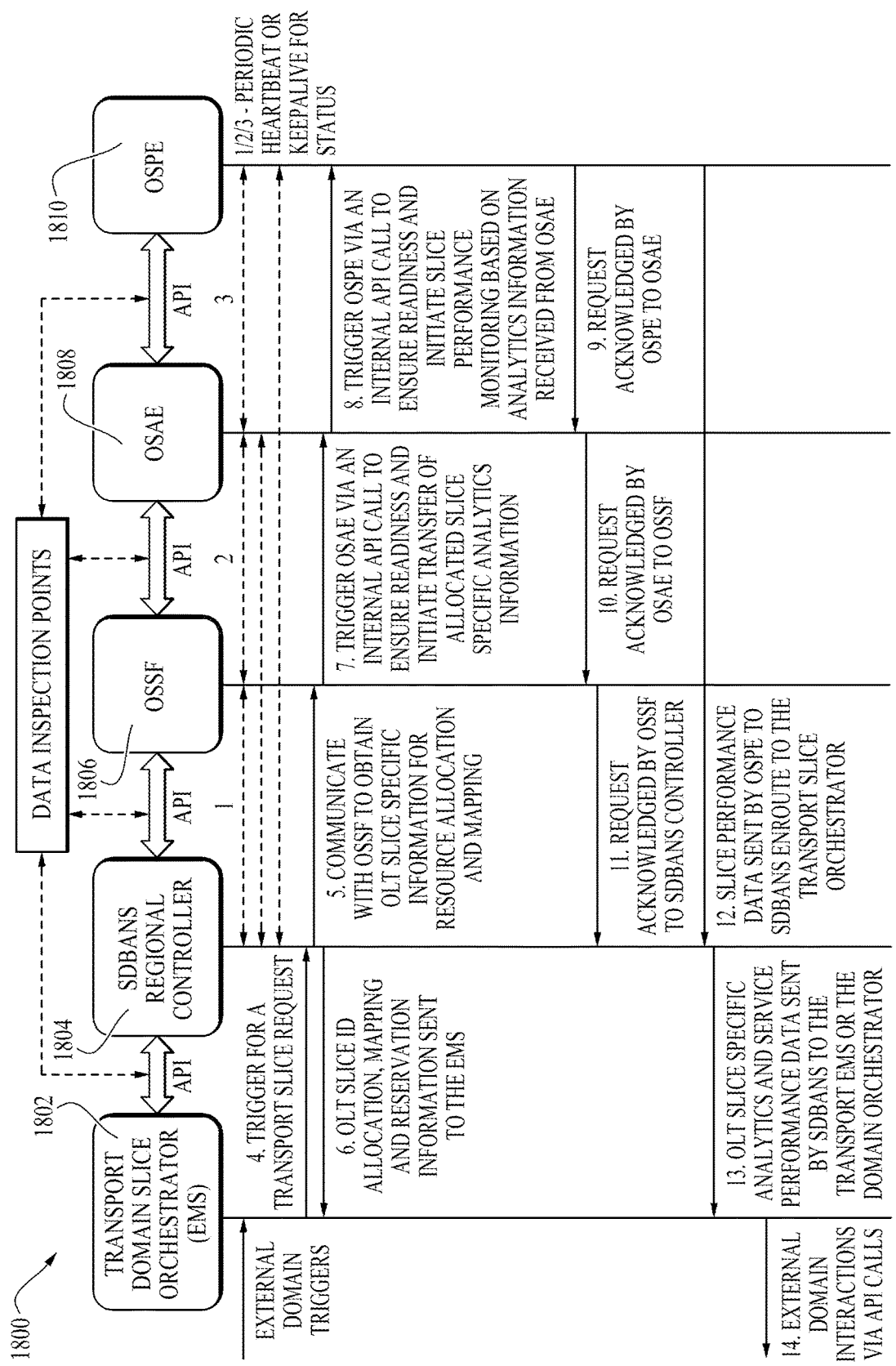
FIG. 18 is a message diagram showing an example of transport network slice information exchange.

FIG. 18 shows an example of transport network slice information exchange 1800. In the example of FIG. 18, transport network slice information exchange 1800 includes a transport domain slice orchestrator (EMS) 1802, an SDBANS controller 1804, an OSSF 1806, an OSAE 1808, and an OSPE 1810.

Initially, SDBANS controller 1804, OSSF 1806, OSAE 1808, and OSPE 1810 exchange periodic messages for status updates. Transport domain slice orchestrator (EMS) 1802 may control multiple SDBANS controllers for different associated regions (see e.g., FIG. 19), with different TN NSSI IDs mapped to different slices. To initiate transport network slicing, transport domain slice orchestrator (EMS) 1802 receives an external domain trigger to provide the transport resources sought to deliver certain services (eMBB, URLLC, CV2X, etc.). For instance, the external domain trigger includes information exchanged through the API, initially based on a service request from an end user that is requesting a service to the access domain, and then based on API call from an access domain orchestrator to transport domain slice orchestrator (EMS) 1802. In other embodiments, triggers are generated from the core network domain. The API calls themselves may include information such as, for example, the type of service, QoS, latency specifications, dedicated resource capabilities or shared resource, and resource utilization.

In response, transport domain slice orchestrator (EMS) 1802 generates a trigger to SDBANS controller 1804 for a transport slice request. As mentioned above, this trigger may be implemented as an API call, and the API call may include information for allocating the slice.

SDBANS controller 1804 communicates with its OSSF-OSAE-OSPE services to allocate and map a vendor-specific OLT ID SKU (or other high-level hardware identifier such as a node ID) and OSIDs for one or more ports. For instance, SDBANS controller 1804 selects from a group of OLT vendors for the geographical region associated with the transport slice request, a selected OLT vendor such that the information of the response indicates the selected OLT vendor. In another example, SDBANS controller 1804 selects from a group of OLT SKUs for the geographical region associated with the transport slice request, a selected OLT SKU such that the information of the response indicates the selected OLT SKU. And in another example, SDBANS controller 1804 selects from a group of OLT node IDs for the geographical location associated with the transport slice request, a selected OLT node ID such that the information of the response indicates the selected OLT node ID, in which each OLT node ID corresponds to a geographical region and a vendor.

Once an OLT slice allocation is made, that information is provided back to transport domain slice orchestrator (EMS) 1802. The OLT slice allocation may include other information such as service type (ST).

Next, in response to services being provided via the OLT slice allocation, SDBANS controller 1804 generates slice analytics data indicating slice utilization and availability. For instance, generating the slice analytics data optionally entails aggregating packet-level statistics of a certain service type associated with control plane signaling and user data with transport protocols, IP or non-IP data (in case of IoT services), Ethernet packets that belong to Ethernet PDU sessions, number of tunnel identifiers being used between specific interfaces between two end points across multiple domains (access-transport and transport-core), and other types of data aggregation.

In some embodiments, the slice analytics data includes control plane analytics associated with the transport network slice, such as, for example a number of RRC connections, number of session establishment messages, number of registrations, or other types of control plane information. In other embodiments, the slice analytics data comprises user plane traffic analytics data associated with the transport network slice such as, for example, data usage, latency, CPU utilization, or other types of user plan information.

Once the slice analytics data has been generated, SDBANS controller 1804 provides the slice analytics data to transport domain slice orchestrator (EMS) 1802. Transport domain slice orchestrator (EMS) 1802 can then expose this information to a specific domain orchestrator, a converged domain orchestrator, or other systems.

FIG. 19 shows an example of a transport network slice map 1900, which is maintained at the orchestration level since the orchestrator has visibility over multiple regions corresponding to multiple SDBANS controllers. Depending on the number of serving CPON OLTs in that region, a mapping is defined in an SDBANS controller as follows. SDBANS Controller—Region—whitebox vendor #—OLT ID SKU #—OLT Slice ID #. TN NSSI ID is mapped to SDBANS controller ID which is then internally mapped to Region—Vendor—OLT ID SKU—OLT slice ID. Traffic is then monitored at the SDBANS controller level to ensure SLAs are being met across the TN as well as from an E2E perspective.

To map a transport network slice instance, there are several considerations. The various 5G slice STs (eMBB/URLLC/MIoT/CV2X/Public Safety) for serving a given market/region are identified. For each 5G slice service type, an E2E network slice instance ID is designated. An operator defines strict service level assurance (SLA) criteria for each of these slice service types. RAN, transport, and core network slices need to be cooperative to achieve the E2E slice-specific SLA. The E2E network slice instance ID is associated to the cross-domain slice IDs (RAN, transport, and core NSSI IDs, as shown in FIG. 11). Within the transport network domain, a specific mapping of the TN NSSI ID is associated to the CPON OLT slicing technique described in the table of FIG. 19. Transport network is served by XGS-PON solution to carry the data from 5G radio access network to the centralized core hosted in a cloud data center.

In the transport network slice mapping example of FIG. 19, the transport network in a 5G serving area supports five 5G slice service types. The example also shows a three-region transport network deployment model with a dedicated SDBANS controller per region. Each SDBANS regional controller operates in a redundant mode for failover operation. Each regional controller manages its (1) standardized northbound interface is towards a common transport management/orchestration layer; (2) southbound interface via standard API triggers for exchange of the mapping configuration, fault, and performance data; (3) multi-vendor, multi-SKU OLT platform to support multi-service types across multiple virtual network operators; (4) complete inventory of the vendor-specific OLT slices and associated service types such as when multi-vendor CPON OLT whitebox hardware solutions are deployed in that region to minimize CapEx; and (5) operational state of the slices for intelligent traffic steering, switching, and splitting. The CPON OLTs communicate via open standards/ONF-defined interface to the associated SDBANS controller.

FIG. 19 also shows an example of subservice (e.g., eMBB.1, eMBB.2, etc.) mapping. In this example, subservices may receive an OLT slice allocation to support a QoS (or other performance capability) for that particular subservice.

Figure 20:
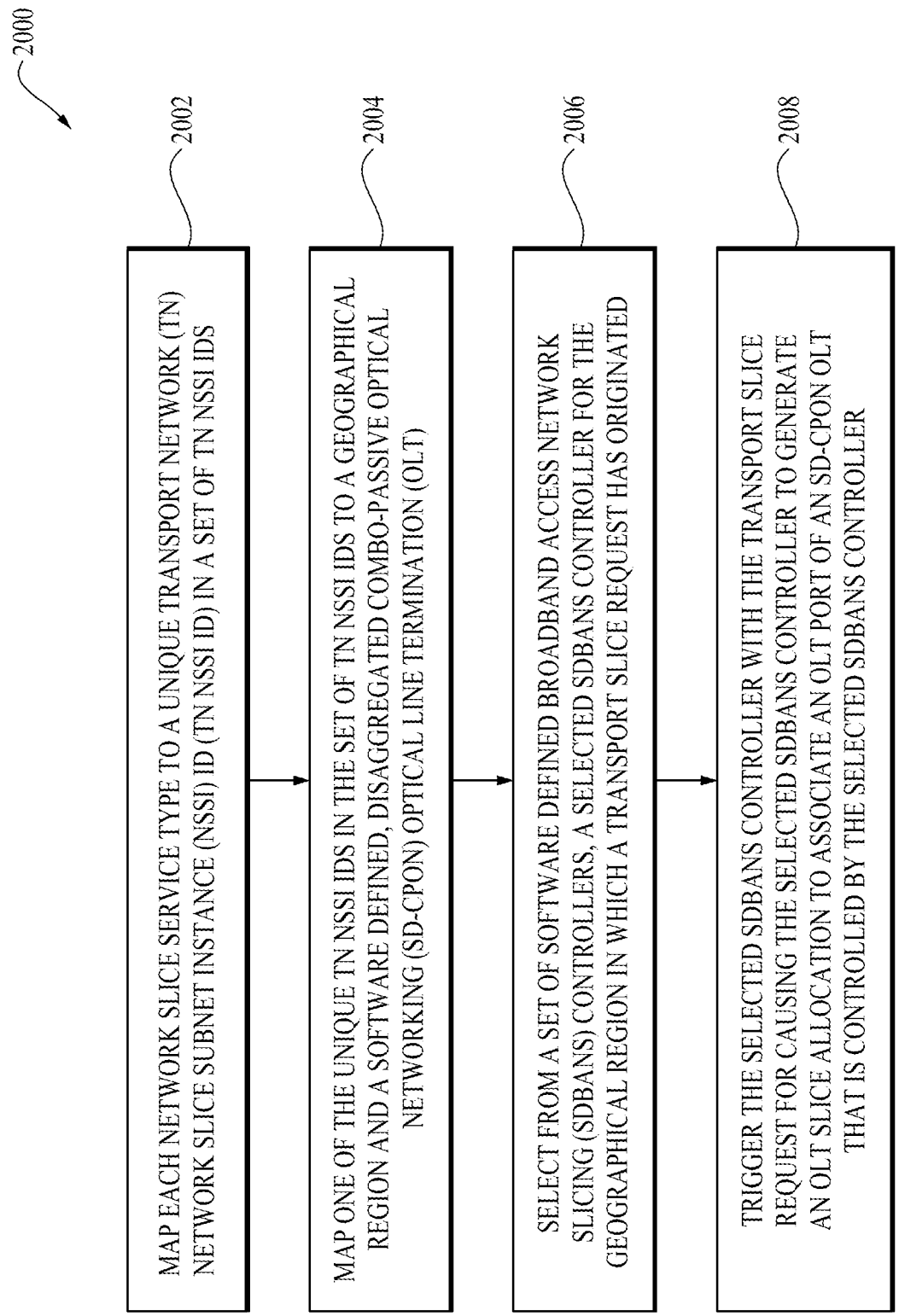
FIG. 20 is a flow chart of a process, performed by a transport domain slice orchestrator, of orchestrating transport network slices in accordance with one embodiment.

FIG. 20 shows a process 2000, performed by a transport domain slice orchestrator, of orchestrating transport network slices. In block 2002, process 2000 maps each network slice ST to a unique TN NSSI ID in a set of TN NSSI IDs. In block 2004, process 2000 maps one of the unique TN NSSI IDs in the set of TN NSSI IDs to a geographical region and a SD-CPON OLT. In block 2006, process 2000 selects from a set of SDBANS controllers, a selected SDBANS controller for the geographical region in which a transport slice request has originated. In block 2008, process 2000 triggers the selected SDBANS controller with the transport slice request for causing the selected SDBANS controller to generate an OLT slice allocation to associate an OLT port of an SD-CPON OLT that is controlled by the selected SDBANS controller.

Process 2000 may also include mapping of the one of the unique TN NSSI IDs to an SDBANS controller ID representing the geographical region, vendor, SKU, OLT slice ID, and ST.

Process 2000 may also include triggering the selected SDBANS controller in response to an API trigger originated from an access or core domain.

Process 2000 may also include, receiving, in response to the triggering, the OLT slice allocation.

Process 2000 may also include, in response to services provided via the OLT slice allocation, receiving slice analytics data indicating slice utilization and availability.

Process 2000 may also include providing the slice analytics data to a converged domain orchestrator.

Process 2000 may also include each network slice service type having a subservice type with an associated QoS.

FIG. 21 is a block diagram illustrating components 2100 of an SD-CPON or orchestration system, according to some example embodiments. Components 2100 able to read instructions from a machine-readable or computer-readable medium (e.g., a non-transitory machine-readable storage medium) and perform any one or more of SDBANS or orchestration tasks discussed herein, such as, for example transport network slice information exchange 1800 or process 2000. Specifically, FIG. 21 shows a diagrammatic representation of hardware resources 2102 including one or more processors 2104 (or processor cores), one or more memory/storage devices 2106, and one or more communication resources 2108, each of which may be communicatively coupled via a bus 2110. For embodiments where node virtualization (e.g., NFV) is utilized, a hypervisor 2112 may be executed to provide an execution environment for one or more network slices/sub-slices to utilize the hardware resources 2102.

Processors 2104 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2114 and a processor 2116.

Memory/storage devices 2106 may include main memory, disk storage, or any suitable combination thereof. Memory/storage devices 2106 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

Communication resources 2108 may include interconnection or network interface components or other suitable devices to communicate with one or more peripheral devices 2118 or one or more databases 2120 via a network 2122. For example, communication resources 2108 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2124 may comprise software, a program, an application, an applet, an app, or other executable code for causing at least any of processors 2104 to perform any one or more of SABR engine tasks discussed herein. Instructions 2124 may reside, completely or partially, within at least one of processors 2104 (e.g., within the processor's cache memory), memory/storage devices 2106, or any suitable combination thereof. Furthermore, any portion of instructions 2124 may be transferred to hardware resources 2102 from any combination of peripheral devices 2118 or databases 2120. Accordingly, memory of the processors 2104, memory/storage devices 2106, peripheral devices 2118, and databases 2120 are examples of computer-readable and machine-readable media.

Skilled persons will appreciate that many changes may be made to the details of the above-described embodiments without departing from the underlying principles of the invention. The scope of the present invention should, therefore, be determined only by the following claims and equivalents.

What is claimed is:

1. In a software defined broadband access network slicing (SDBANS) controller, a method of establishing a transport network slice, comprising:
   receiving, from a transport domain slice orchestrator, a trigger for a transport slice request;
   generating, based on a geographical region associated with the transport slice request, an optical line termination (OLT) slice allocation to associate an OLT port of a software defined, disaggregated combo-passive optical networking (SD-CPON) OLT with the transport network slice; and
   providing to the transport slice domain orchestrator a response to the trigger, the response including information indicating the OLT slice allocation for the geographical region associated with the transport slice request.

2. The method of claim 1, further comprising selecting from a group of OLT vendors for the geographical region associated with the transport slice request, a selected OLT vendor such that the information of the response indicates the selected OLT vendor.

3. The method of claim 1, further comprising selecting from a group of OLT SKUs for the geographical region associated with the transport slice request, a selected OLT SKU such that the information of the response indicates the selected OLT SKU.

4. The method of claim 1, in which the information indicating the OLT slice allocation includes an OLT slice ID within an OLT SKU for a selected OLT vendor.

5. The method of claim 4, in which the OLT slice ID corresponds to multiple ports of the SD-CPON OLT.

6. The method of claim 1, further comprising selecting from a group of OLT node IDs for the geographical region associated with the transport slice request, a selected OLT node ID such that the information of the response indicates the selected OLT node ID, in which each OLT node ID corresponds to a regional vendor.

7. The method of claim 1, in which the information includes service type.

8. The method of claim 1, in which the SDBANS controller is included in the SD-CPON OLT.

9. The method of claim 1, further comprising:
   in response to services provided via the OLT slice allocation, generating slice analytics data indicating slice utilization and availability; and
   providing the slice analytics data to the transport domain slice orchestrator.

10. The method of claim 9, in which the slice analytics data comprises control plane traffic analytics data associated with the transport network slice.

11. The method of claim 9, in which the slice analytics data comprises user plane traffic analytics data associated with the transport network slice.

12. The method of claim 1, in which each OLT port corresponds to a unique OSID.

13. The method of claim 1, in which multiple OLT ports correspond to a unique OSID.

14. A method, performed by a transport domain slice orchestrator, of orchestrating transport network slices, the method comprising:
   mapping each network slice service type to a unique transport network (TN) network slice subnet instance (NSSI) ID (TN NSSI ID) in a set of TN NSSI IDs;
   mapping one of the unique TN NSSI IDs in the set of TN NSSI IDs to a geographical region and a software defined, disaggregated combo-passive optical networking (SD-CPON) optical line termination (OLT);
   selecting from a set of software defined broadband access network slicing (SDBANS) controllers, a selected SDBANS controller for the geographical region in which a transport slice request has originated; and
   triggering the selected SDBANS controller with the transport slice request for causing the selected SDBANS controller to generate an OLT slice allocation to associate an OLT port of an SD-CPON OLT that is controlled by the selected SDBANS controller.

15. The method of claim 14, in which the mapping of the one of the unique TN NSSI IDs further comprises mapping it to an SDBANS controller ID representing the geographical region, vendor, SKU, OLT slice ID, and service type (ST).

16. The method of claim 14, in which the triggering the selected SDBANS controller is in response to an API trigger originated from an access or core domain.

17. The method of claim 14, further comprising, receiving, in response to the triggering, the OLT slice allocation.

18. The method of claim 14, further comprising, in response to services provided via the OLT slice allocation, receiving slice analytics data indicating slice utilization and availability.

19. The method of claim 18, further comprising providing the slice analytics data to a converged domain orchestrator.

20. The method of claim 14, in which each network slice service type includes a subservice type with an associated quality of service.

* * * * *